US012176601B2

(12) United States Patent
Cho et al.

(10) Patent No.: US 12,176,601 B2
(45) Date of Patent: Dec. 24, 2024

(54) ANTENNA AND ELECTRONIC DEVICE INCLUDING THE SAME

(71) Applicant: SAMSUNG ELECTRONICS CO., LTD., Suwon-si (KR)

(72) Inventors: Namjun Cho, Suwon-si (KR); Hyoseok Na, Suwon-si (KR); Jihee Kang, Suwon-si (KR); Youngju Kim, Suwon-si (KR); Junghwan Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 184 days.

(21) Appl. No.: 17/702,308

(22) Filed: Mar. 23, 2022

(65) Prior Publication Data

US 2022/0263229 A1 Aug. 18, 2022

Related U.S. Application Data

(63) Continuation of application No. PCT/KR2022/002404, filed on Feb. 18, 2022.

(30) Foreign Application Priority Data

Feb. 18, 2021 (KR) ........................ 10-2021-0022186
Jun. 16, 2021 (KR) ........................ 10-2021-0078183

(51) Int. Cl.
*H01Q 1/24* (2006.01)
*H01Q 1/22* (2006.01)
*H01Q 21/06* (2006.01)

(52) U.S. Cl.
CPC ........... *H01Q 1/243* (2013.01); *H01Q 1/2283* (2013.01); *H01Q 21/065* (2013.01)

(58) Field of Classification Search
CPC .... H01Q 1/243; H01Q 1/2283; H01Q 21/065; H01Q 1/24; H01Q 1/38; H01Q 5/335;
(Continued)

(56) References Cited

U.S. PATENT DOCUMENTS

2016/0204514 A1 7/2016 Miraftab et al.
2016/0351996 A1 12/2016 Ou
(Continued)

FOREIGN PATENT DOCUMENTS

GB 2429336 2/2007
KR 10-0706615 4/2007
(Continued)

OTHER PUBLICATIONS

Search Report and Written Opinion dated May 31, 2022 in counterpart International Patent Application No. PCT/KR2022/002404.
(Continued)

*Primary Examiner* — Jean B Jeanglaude
(74) *Attorney, Agent, or Firm* — Nixon & Vanderhye P.C.

(57) ABSTRACT

Various embodiments of the disclosure relate to an electronic device including an antenna. An electronic device may include: a housing, a main substrate s disposed in an inner space of the housing and including a first surface facing a first direction and a second surface facing a second direction opposite to the first direction, and an antenna module disposed on the main substrate, wherein the antenna module includes a first substrate disposed on the first surface of the main substrate and including at least one antenna, the main substrate including multiple through-holes, multiple antenna structures disposed to penetrate the multiple through-holes, respectively, and include at least one antenna element including at least one antenna spaced at a designated interval, and matching structure comprising impedance matching circuitry disposed on the first substrate and
(Continued)

configured to match impedance for the at least one antenna element included in each of the multiple antenna structures.

20 Claims, 20 Drawing Sheets

(58) Field of Classification Search
CPC ...... H01Q 9/0485; H01Q 21/06; H01Q 21/08; H01Q 21/24
USPC .......................................................... 343/702
See application file for complete search history.

(56) References Cited

U.S. PATENT DOCUMENTS

| | | | |
|---|---|---|---|
| 2016/0359461 | A1 | 12/2016 | He et al. |
| 2017/0126046 | A1 | 5/2017 | Contopanagos |
| 2018/0233465 | A1 | 8/2018 | Spella et al. |
| 2019/0027838 | A1 | 1/2019 | Paulotto et al. |
| 2019/0081404 | A1 | 3/2019 | Jeon et al. |
| 2020/0006853 | A1 | 1/2020 | Park et al. |
| 2020/0280131 | A1 | 9/2020 | Avser et al. |
| 2020/0358173 | A1 | 11/2020 | Jong et al. |
| 2022/0069442 | A1 | 3/2022 | Kim et al. |

FOREIGN PATENT DOCUMENTS

| | | |
|---|---|---|
| KR | 10-2019-0030311 | 3/2019 |
| KR | 10-2020-0003509 | 1/2020 |
| KR | 10-2020-0091622 | 7/2020 |
| KR | 10-2020-0129884 | 11/2020 |

OTHER PUBLICATIONS

Extended European Search Report dated Apr. 22, 2024 issued in European Patent Application No. 22756537.1.

ANTENNA AND ELECTRONIC DEVICE INCLUDING THE SAME

CROSS-REFERENCE TO RELATED APPLICATIONS

This application is a continuation of International Application No. PCT/KR2022/002404 designating the United States, filed on Feb. 18, 2022, in the Korean Intellectual Property Receiving Office and claiming priority to Korean Patent Application No. 10-2021-0022186, filed on Feb. 18, 2021, in the Korean Intellectual Property Office, and to Korean Patent Application No. 10-2021-0078183, filed on Jun. 16, 2021, in the Korean Intellectual Property Office, the disclosures of all of which are incorporated by reference herein in their entireties.

BACKGROUND

Field

The disclosure relates to an antenna and an electronic device including the same.

Description of Related Art

In line with development of wireless communication technologies, electronic devices (for example, electronic devices for communication) have been widely used in daily life, and use of contents has accordingly been increasing exponentially. Network capacities have nearly reached limits as a result of such ever-increasing content use. In order to satisfy wireless data traffic demands that have been increasing since commercialization of 4$^{th}$ generation (4G) communication systems, there has been research regarding communication systems (for example, 5$^{th}$ generation (5G), pre-5G communication systems or new ratio (NR)) configured to transmit and/or receive signals using frequencies in high-frequency bands (for example, mmWave, about 3 GHz-300 GHz bands).

An electronic device may include an antenna module capable of transmitting and/or receiving signals using frequencies in high-frequency bands (for example, mmWave, about 3 GHz-300 GHz bands). Antenna modules have been developed to have efficient mounting structures and in various types corresponding thereto, in order to overcome high levels of free space loss resulting from high-frequency band characteristics and to increase the gain. For example, an antenna module may include an array antenna having various numbers of antenna elements (for example, conductive patches and/or conductive patterns) disposed at an interval on a dielectric structure (for example, substrate).

The antenna module may include a wireless communication circuit (for example, radio frequency front end (RFFE) for transmitting and/or receiving signals substantially simultaneously through multiple antenna elements included in the array antenna. The wireless communication circuit may include multiple amplifier circuits (for example, power amplifier (PA)) and/or low noise amplifier (LNA)) and/or multiple frequency conversion devices (for example, mixer and/or phase lock loop (PLL)) to transmit and/or receive signals through respective antenna elements. The wireless communication circuit (for example, RFFE) may require a larger physical region in proportion to the complexity of the structure.

As electronic devices become slimmer, the size of the inner space thereof decreases, and it may be difficult to secure a space to dispose an antenna module (for example, array antenna and/or wireless communication circuit).

SUMMARY

Embodiments of the disclosure provide a device and a method for reducing the size of a space (for example, physical region) of an electronic device, in which an antenna module (for example, array antenna and/or wireless communication circuit) is disposed.

According to various example embodiments, an electronic device may include: a housing, a main substrate disposed in an inner space of the housing and including a first surface facing a first direction and a second surface facing a second direction opposite to the first direction, and an antenna module disposed on the main substrate, wherein the antenna module includes: a first substrate disposed on the first surface of the main substrate, the main substrate including multiple through-holes, multiple antenna structures disposed to penetrate the multiple through-holes, respectively, and including at least one antenna element including at least one antenna spaced at a designated interval, and a matching structure comprising impedance matching circuitry disposed on the first substrate and configured to match impedance for the at least one antenna element included in each of the multiple antenna structures.

According to various example embodiments, an electronic device may include: a housing, a main substrate disposed in an inner space of the housing and including a first surface facing a first direction and a second surface facing a second direction opposite to the first direction, multiple antenna structures including at least one antenna element including at least one antenna spaced and disposed at a designated interval on the first surface of the main substrate, and multiple sub substrates arranged adjacent to the multiple antenna structures on the first surface of the main substrate, wherein the multiple sub substrates include a matching structure comprising impedance matching circuitry configured to match impedance for the at least one antenna element included in each of the multiple antenna structures.

According to various example embodiments of the disclosure, an electronic device may be configured such that multiple antenna structures on which at least one antenna element is disposed and electric connection structures and/or matching structures of the at least one antenna element are separately disposed, thereby securing a space in which an antenna module (for example, array antenna and/or wireless communication circuit) is disposed, and reducing impedance matching loss and/or insert loess due to the main substrate.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments will be described in greater detail with reference to the figures.

Figure 1:
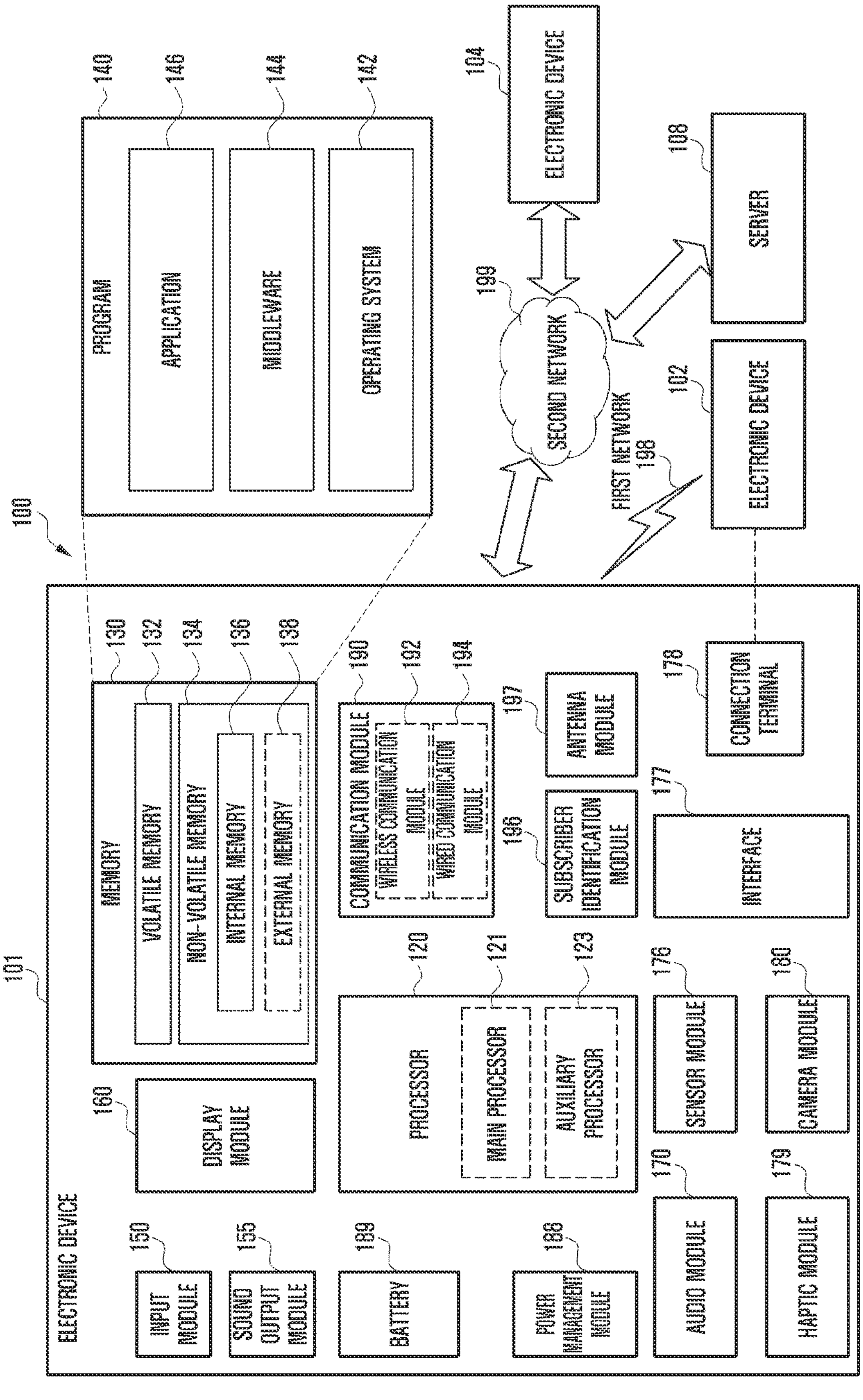
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GLASS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. According to an embodiment, the subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include patch array antennas and/or dipole array antennas.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
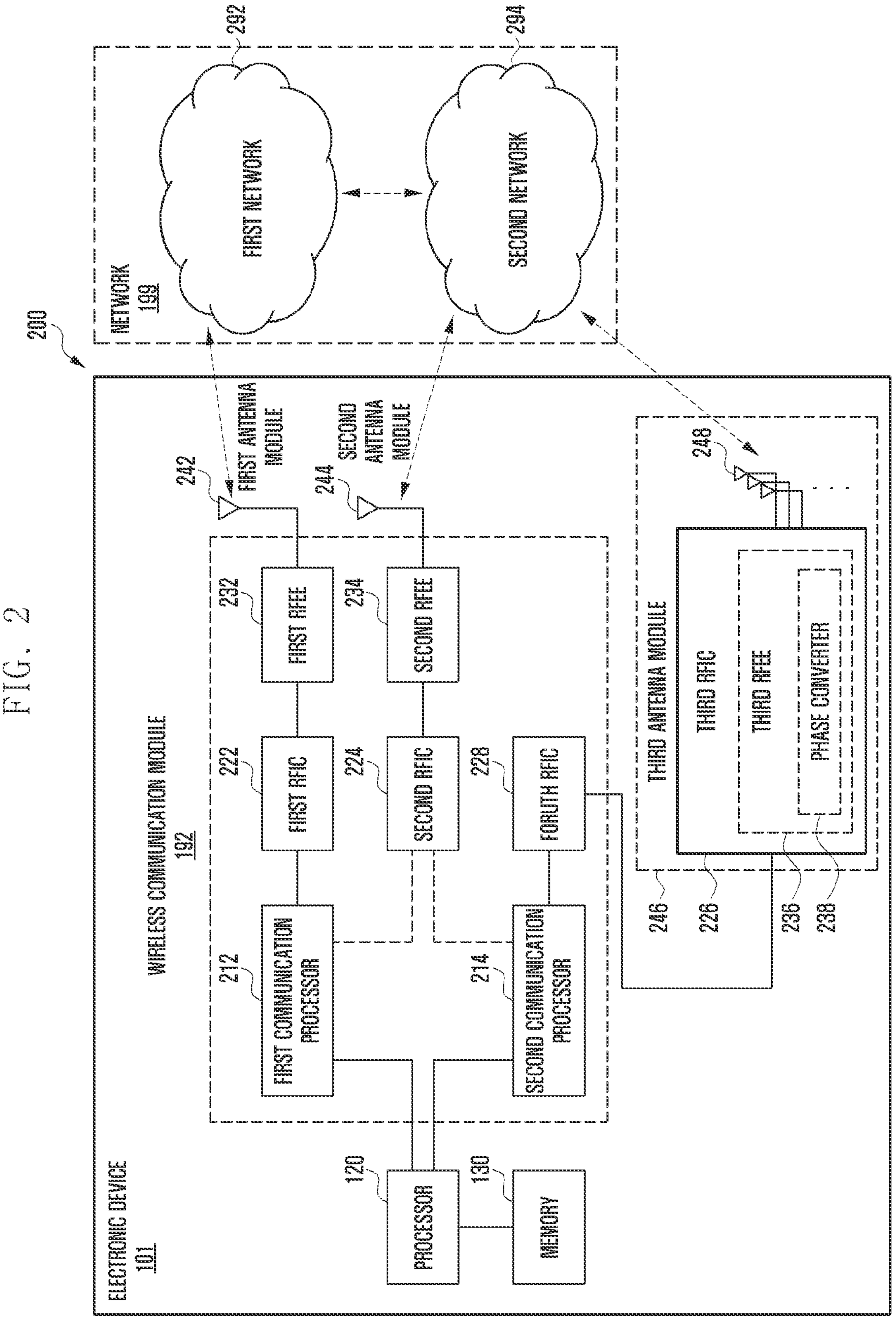
FIG. 2 is a block diagram illustrating an example configuration of an electronic device for supporting legacy communication and 5G network communication according to various embodiments.

FIG. 2 is a block diagram 200 illustrating an example configuration of an electronic device 101 supporting legacy network communication and 5G network communication according to various embodiments.

Referring to FIG. 2, according to various embodiments, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may include the processor 120 and the memory 130. The network 199 may include a first network 292 and a second network 294. According to an embodiment, the electronic device 101 may further include at least one component among the components illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may be at least a part of the wireless communication module 192. According to an embodiment, the fourth RFIC 228 may be omitted, or may be included as a part of the third RFIC 226.

The first communication processor 212 may establish a communication channel of a band to be used for wireless communication with the first network 292, and may support legacy network communication via the established communication channel. According to an embodiment, the first network may be a legacy network including second generation (2G), third generation (3G), fourth generation (4G), or long-term evolution (LTE) network. The second communication processor 214 may establish a communication channel corresponding to a designated band (e.g., approximately 6 GHz to 60 GHz) among bands to be used for wireless communication with the second network 294, and may support 5G network communication via the established communication channel. According to an embodiment, the second network 294 may be a 5G network (e.g., new radio (NR)) defined in 3GPP. In addition, according to an embodiment, the first communication processor 212 or the second communication processor 214 may establish a communication channel corresponding to another designated band (e.g., approximately 6 GHz or less) among bands to be used for wireless communication with the second network 294, and may support 5G network communication via the established communication channel. According to an embodiment, the first communication processor 212 and the second communication processor 214 may be implemented in a single chip or a single package. According to an embodiment, the first communication processor 212 or the second communication processor 214 may be implemented in a single chip or a single package, together with the processor 120, the sub-processor 123, or the communication module 190.

According to an embodiment, the first communication processor 212 may perform data transmission or reception with the second communication processor 214. For example, data which has been classified to be transmitted via the second network 294 may be changed to be transmitted via the first network 292.

In this instance, the first communication processor 212 may receive transmission data from the second communication processor 214. For example, the first communication processor 212 may perform data transmission or reception with the second communication processor 214 via an inter-processor interface. The inter-processor interface may be implemented as, for example, a universal asynchronous receiver/transmitter (UART) (e.g., a high speed-UART (HS-UART)) or a peripheral component interconnect bus express (PCIe), but the type of interface is not limited thereto. For example, the first communication processor 212 and the second communication processor 214 may exchange control information and packet data information using, for example, a shared memory. For example, the first communication processor 212 may perform transmission or reception of various types of information such as sensing information, information associated with an output strength, and resource block (RB) allocation information, with the second communication processor 214.

Depending on implementation, the first communication processor 212 may not be directly connected to the second communication processor 214. In this instance, the first communication processor 212 may perform data transmission or reception with the second communication processor 214, via the processor 120 (e.g., an application processor). For example, the first communication processor 212 and the second communication processor 214 may perform data transmission or reception via the processor 120 (e.g., an application processor) and a HS-UART interface or a PCIe interface, but the type of interface is not limited. For example, the first communication processor 212 and the second communication processor 214 may exchange control information and packet data information using the processor 120 (e.g., an application processor) and a shared memory. According to an embodiment, the first communication processor 212 and the second communication processor 214 may be implemented in a single chip or a single package. According to various embodiments, the first communication processor 212 or the second communication processor 214 may be implemented in a single chip or a single package, together with the processor 120, the sub-processor 123, or the communication module 190.

In the case of transmission, the first RFIC 222 may convert a baseband signal generated by the first communication processor 212 into a radio frequency (RF) signal in the range of approximately 700 MHz to 3 GHz, which is used in the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal into a baseband signal so that the baseband signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) in an Sub6 band (e.g., approximately 6 GHz or less) used in the second network 294 (e.g., a 5G network). In the case of reception, a 5G Sub6 RF signal may be obtained from the second network 294 (e.g., a 5G network) via an antenna (e.g., the second antenna module 244), and may be preprocessed by an RFFE (e.g., the second RFFE 234). The second RFIC 224 may convert the preprocessed 5G Sub6 RF signal into a baseband signal so that the signal may be processed by a corresponding communication processor among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used in the second network 294 (e.g., a 5G network). In the case of reception, a 5G Above6 RF signal is obtained from the second network 294 (e.g., a 5G network) via an antenna (e.g., the antenna 248), and may be preprocessed by the third RFFE 236. The third RFIC 226 may convert the preprocessed 5G Above6 RF signal into a baseband signal so that the signal is processed by the second communication processor 214. According to an embodiment, the third RFFE 236 may be implemented as a part of the third RFIC 226.

According to an embodiment, the electronic device 101 may include the fourth RFIC 228, separately from or, as a part of, the third RFIC 226. In this instance, the fourth RFIC 228 may convert a baseband signal produced by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal into a 5G Above6 RF signal. In the case of reception, a 5G Above6 RF signal may be received from the second network 294 (e.g., a 5G network) via an antenna (e.g., the antenna 248), and may be converted into an IF signal by the third RFIC 226. The fourth RFIC 228 may convert the IF signal into a baseband signal so that the second communication processor 214 is capable of processing the baseband signal.

According to an embodiment, the first RFIC 222 and the second RFIC 224 may be implemented as at least a part of a single chip or a single package. According to an embodiment, the first RFFE 232 and the second RFFE 234 may be implemented as at least a part of a single chip or single package. According to an embodiment, at least one of the first antenna module 242 or the second antenna module 244 may be omitted or may be combined with another antenna module, to process RF signals of a plurality of corresponding bands.

According to an embodiment, the third RFIC 226 and the antenna 248 may be disposed in the same substrate, and may form a third antenna module 246. For example, the wireless communication module 192 or the processor 120 may be disposed in a first substrate (e.g., a main PCB). In this instance, the third RFIC 226 is disposed in a part (e.g., a lower part) of a second substrate (e.g., a sub PCB) different from the first substrate, and the antenna 248 is disposed in another part (e.g., an upper part), so that the third antenna module 246 may be formed. By disposing the third RFIC 226 and the antenna 248 in the same substrate, the length of a transmission line therebetween may be reduced. For example, this may reduce a loss (e.g., a diminution) of a high-frequency band signal (e.g., approximately 6 GHz to 60 GHz) used for 5G network communication, the loss being caused by a transmission line. Accordingly, the electronic device 101 may improve the quality or speed of communication with the second network 294 (e.g., a 5G network).

According to an embodiment, the antenna 248 may be implemented as an antenna array including a plurality of antenna elements which may be used for beamforming. In this instance, the third RFIC 226, for example, may include a plurality of phase shifters 238 corresponding to a plurality of antenna elements, as a part of the third RFFE 236. In the case of transmission, each of the plurality of phase shifters 238 may shift the phase of a 5G Above6RF signal to be transmitted to the outside of the electronic device 101 (e.g., a base station of a 5G network) via a corresponding antenna element. In the case of reception, each of the plurality of phase shifters 238 may shift the phase of a 5G Above6 RF signal received from the outside via a corresponding antenna element into the same or substantially the same phase. This may enable transmission or reception via beamforming between the electronic device 101 and the outside.

The second network 294 (e.g., a 5G network) may operate independently (e.g., Standalone (SA)) from the first network 292 (e.g., a legacy network), or may operate by being connected thereto (e.g., Non-Standalone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access the access network of the 5G network, and may access an external network (e.g., the Internet) under the control of the core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 130, and may be accessed by another component (e.g., the processor 120, the first communication processor 212, or the second communication processor 214).

Figure 3A:
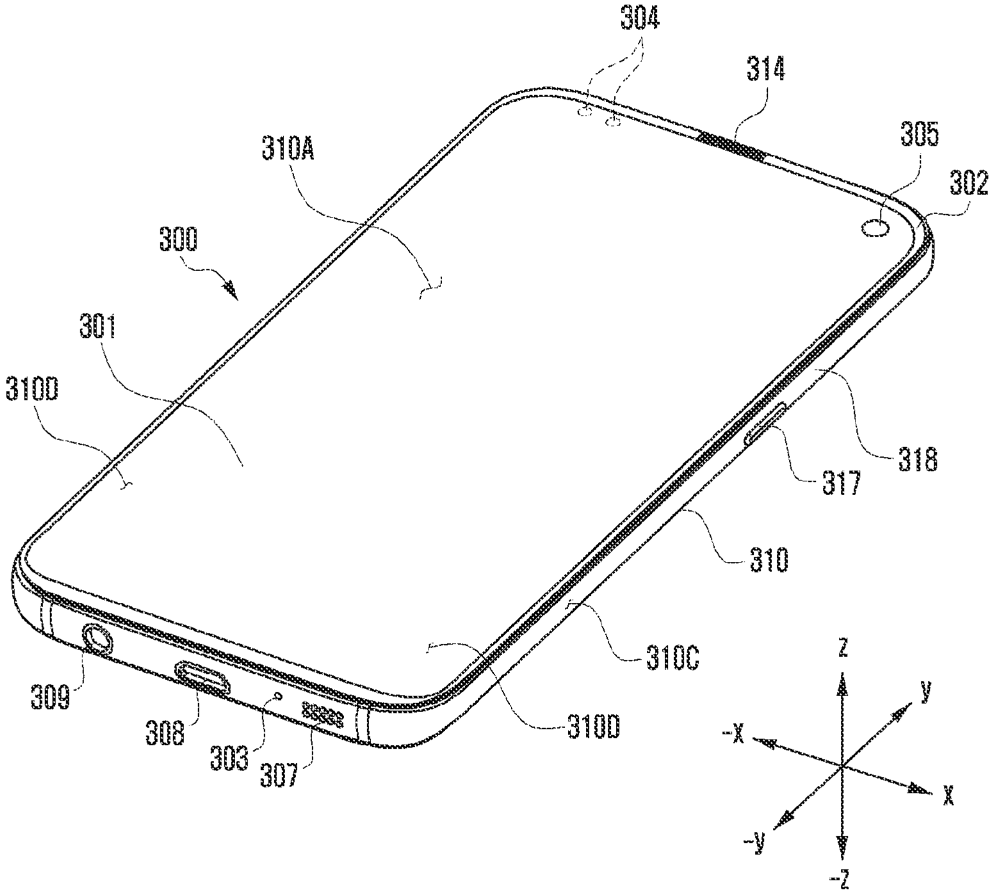
FIG. 3A is a front perspective view of a mobile electronic device according to various embodiments.
Figure 3B:
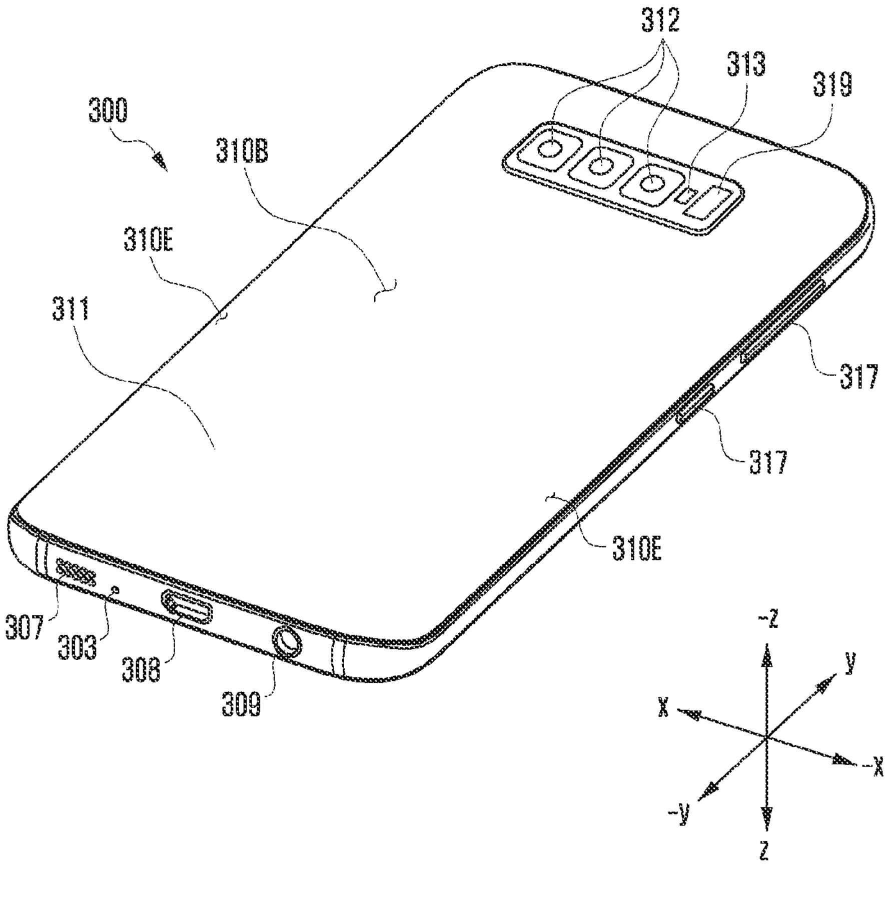
FIG. 3B is a rear perspective view of a mobile electronic device according to various embodiments.

FIG. 3A is a front perspective view of an electronic device 300 according to various embodiments. FIG. 3B is a rear perspective view of an electronic device 300 according to various embodiments. An electronic device 300 of FIG. 3A and FIG. 3B may be at least partially similar to the electronic device 101 of FIG. 1 or FIG. 2, or may include various embodiments of an electronic device.

An electronic device 300 (e.g., the electronic device 101 of FIG. 1) according to various embodiments referring to FIG. 3A and FIG. 3B may include a housing 310 including a first surface 310A (or a front surface), a second surface 310B (or a rear surface), and a side surface 310C configured to surround a space (or, an inner space) between the first surface 310A and the second surface 310B. In an embodiment (not shown), the housing 310 may be referred to as a structure configured to form a part among the first surface 310A, the second surface 310B, and the side surface 310C. According to an embodiment, the first surface 310A may be formed by a front plate 302 (e.g., a glass plate or a polymer plate including various coating layers), at least a portion of which is substantially transparent. The second surface 310B may be formed by a rear plate 311 substantially opaque. For example, the rear plate 311 may be formed of coated or colored glass, ceramic, polymer, metal (e.g., aluminum, stainless steel (STS), or magnesium), or a combination of at least two of the above mentioned materials. The side surface 310C may be formed by a side bezel structure 318 (or a "side member") which is coupled to the front plate 302 and the rear plate 311 and includes a metal and/or polymer. In various embodiments, the rear plate 311 and the side bezel structure 318 may be integrally formed, and may include the same material (e.g., a metal material such as aluminum).

According to various embodiments, the front plate 302 may include first regions 310D which are bent from the first surface 310A toward the rear plate 311, seamlessly extend, and provided in long edge both ends of the front plate 302, respectively. In the illustrated embodiment (refer to FIG. 3B), the rear plate 311 may include second regions 310E which are bent from the second surface 310B toward the front plate 302, seamlessly extend, and provided at long edge both ends thereof, respectively. In various embodiments, the front plate 302 (or the rear plate 311) may include only one of the first regions 310D (or the second regions 310E). In an embodiment, the front plate 302 (or the rear plate 311) may not include a part of the first regions 310D (or the second regions 310E). In an embodiment, when seen from a side surface of the electronic device 300, the side bezel structure 318 may have a first thickness (or width) in the side of a side surface not including the first regions 310D or the second regions 310E, and may have a second thickness thinner than the first thickness in the side of a side surface including the first regions 310D or the second regions 310E.

According to an embodiment, the electronic device 300 may include at least one of a display 301, audio modules 303, 307, and 314, sensor modules 304 and 319, camera modules 305, 312, and 313, a key input device 317, an indicator (not shown), and connector holes 308 and 309. In various embodiments, the electronic device 300 may eliminate at least one (e.g., the key input device 317, the indicator, or the connector holes 308 and 309) of elements, and may additionally include another element.

According to various embodiments, the display 301 may be visually exposed (e.g., visible) through a significant portion of the front plate 302. In various embodiments, at least a part of the display 301 may be visually exposed through the front plate 302 configured to form the first surface 310A and the first regions 310D of the side surface 310C. In various embodiments, the edges of the display 301 may be formed substantially the same as an outer periphery shape of the front plate 302 adjacent thereto. In an embodiment (not shown), in order to expand an area in which the display 301 is visible, the gap between the outer periphery of the display 301 and the outer periphery of the front plate 302 may be formed substantially the same.

In an embodiment (not shown), a recess or an opening may be formed on or through a part of a screen display area of the display 301, and at least one of the audio module 314, the sensor module 304, the camera module 305, or the indicator aligned with the recess or the opening may be included therein. In an embodiment (not shown), at least one of the audio module 314, the sensor module 304, the camera module 305, or the indicator may be included in a rear surface of the screen display area of the display 301. For example, the audio module 314, the camera module 305, the sensor module 304, and/or the indicator may be arranged to be in contact with an external environment through an opening perforated up to the front plate 302 of the display 301 in an inner space of the electronic device 300. For another example, a part of the sensor module 304, the camera module 305, and/or the indicator may be arranged to perform the function thereof without being visually exposed through the front plate 302 in the inner space of the electronic device 300. As an example, it may be unnecessary that regions, which face the sensor module 304, the camera module 305, and/or the indicator, of the display 301 have a perforated opening.

In an embodiment (not shown), the display 301 may be coupled or adjacently disposed to a touch detection circuit, a pressure sensor capable of measuring the intensity (pressure) of touch, and/or a digitizer for detecting a magnetic field-typed stylus pen. In various embodiments, at least a part of the sensor modules 304 and 319, and/or at least a part of the key input device 317 may be arranged in the first regions 310D and/or the second regions 310E.

According to various embodiments, the audio modules 303, 307, and 314 may include a microphone hole 303 and speaker holes 307 and 314. A microphone for acquiring an external sound is disposed in the microphone hole 303, and, in various embodiments, multiple microphones may be arranged to be able to detect the direction of a sound. The speaker holes 307 and 314 may include an external speaker hole 307 and a receiver hole 314 for a call. In various embodiments, the speaker holes 307 and 314 and the microphone hole 303 may be implemented in one hole, or a speaker (e.g., a piezo speaker) may be included without the speaker holes 307 and 314.

According to various embodiments, the sensor module 304 or 319 may generate electric signals or data values corresponding to an operation state or an environment state inside or outside the electronic device 300. For example, the sensor module 304 or 319 may include a first sensor module 304 (e.g., a proximity sensor) and/or a second sensor module (not shown) (e.g., a fingerprint sensor) disposed on the first surface 310A of the housing 310, and/or a third sensor module 319 (e.g., an HRM sensor) disposed on the second surface 310B of the housing 310. The fingerprint sensor may be disposed on not only the first surface 310A (e.g., the display 301) but also the second surface 310B of the housing 310. For example, the fingerprint sensor (e.g., an ultrasonic or optical fingerprint), among the first surface 310A, may be disposed below the display 301. The electronic device 300 may further include a sensor module not shown, for example at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illuminance sensor 304.

According to various embodiments, the camera modules 305, 312, and 313 may include a first camera device 305 disposed on the first surface 310A of the electronic device 300, and a second camera device 312 and/or a flash 313 arranged on the second surface 310B. The camera modules 305 and 312 may include one or multiple lenses, an image sensor, and/or an image signal processor. For example, the flash 313 may include a light-emitting diode or a xenon lamp. In various embodiments, two or more lenses (an infrared camera, a wide-angle lens, and a telephoto lens) and image sensors may be arranged on one surface of the electronic device 300.

According to various embodiments, the key input device 317 may be disposed on the side surface 310C of the housing 310. In an embodiment, the electronic device 300 may not include a part or the whole part among key input devices 317, and the key input device 317 not included therein may be implemented in a soft key type on the display 301. In various embodiments, the key input device 317 may be implemented using a pressure sensor included in the display 301.

According to various embodiments, the indicator (not shown) may be disposed on the first surface 310A of the housing 310. For example, the indicator may provide a state information of the electronic device 300 in the form of light. In an embodiment, for example, the indicator may provide a light source connected with an operation of the camera module 305. For example, the indicator may include, an LED, an IR LED, or a xenon lamp.

According to various embodiments, the connector holes 308 and 309 may include a first connector hole 308 capable of accommodating a connector (e.g., a USB connector) for transmitting/receiving power and/or data to/from an external electronic device, and/or a second connector hole 309 (e.g., an earphone jack) capable of accommodating a connector for transmitting/receiving an audio signal to/from an external electronic device.

Figure 3C:
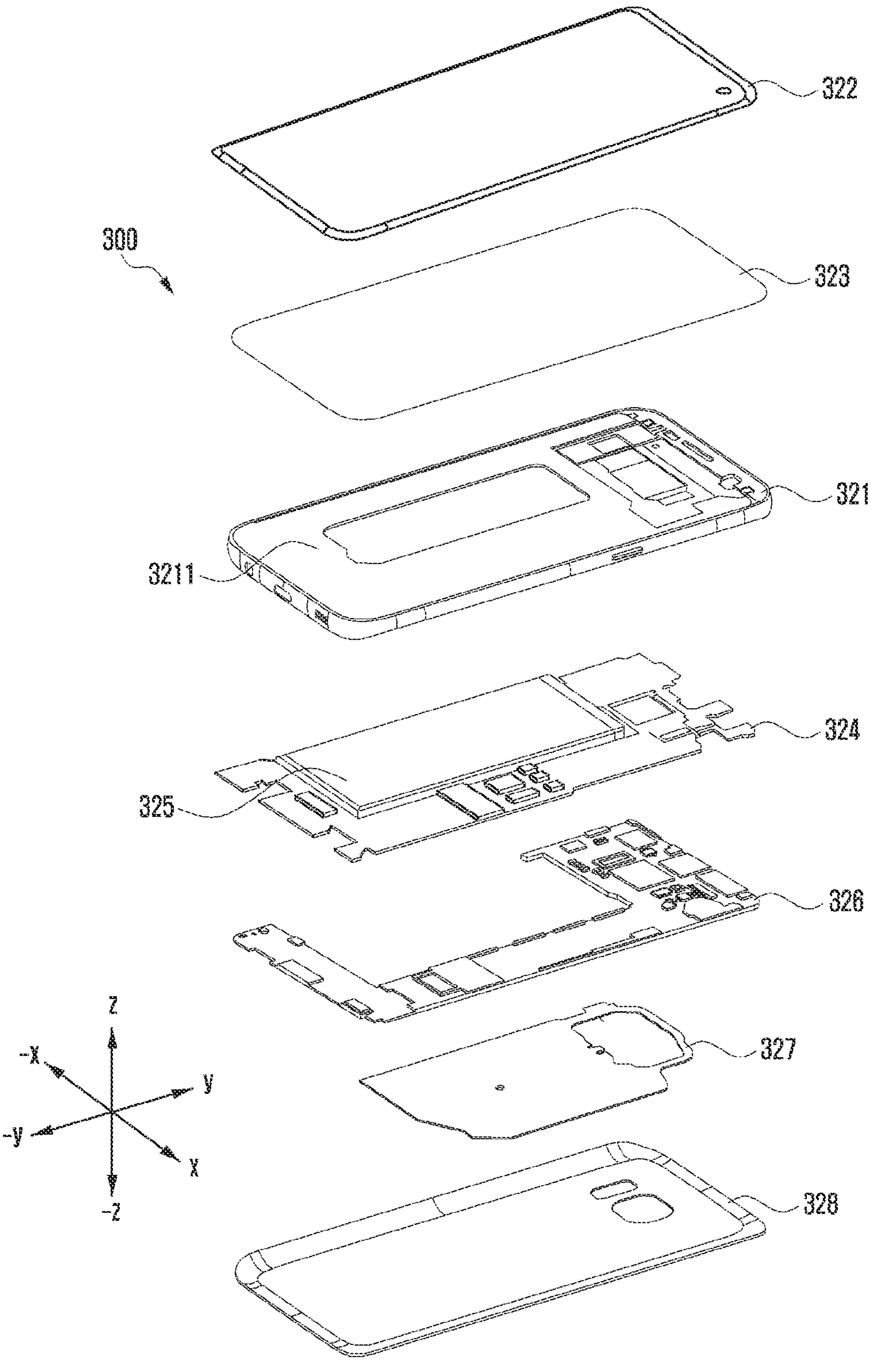
FIG. 3C is an exploded perspective view of a mobile electronic device according to various embodiments.

FIG. 3C is an exploded perspective view of the electronic device 300 according to various embodiments.

According to various embodiments referring to FIG. 3C, the electronic device 300 may include a side bezel structure 321, a first support member 3211 (e.g., a bracket), a front plate 322, a display 323, a printed circuit board 324 (e.g., a main substrate), a battery 325, a second support member 326 (e.g., a rear case), an antenna 327, and a rear plate 328. In various embodiments, the electronic device 300 may eliminate at least one (e.g., the first support member 3211, or the second support member 326) of elements, and may additionally include other element. At least one of elements of the electronic device 300 may be the same as or similar to at least one of elements of the electronic device 300 of FIG. 3A or FIG. 3B, and overlapping descriptions will be omitted hereinafter.

According to various embodiments, the first support member 3211 may be disposed inside the electronic device 300 to be connected to the side bezel structure 321, or may be integrally formed with the side bezel structure 321. For example, the first support member 3211 may be formed of a metal material and/or a nonmetal (e.g., polymer) material. The first support member 3211 may have one surface to which the display 323 is coupled and the other surface to which the printed circuit board 324 is coupled. The printed circuit board 324 may have a processor (e.g., the processor 120 of FIG. 1), a memory (e.g., the memory 130 of FIG. 1), and/or an interface (e.g., the interface 177 of FIG. 1) which are mounted thereon. For example, the processor may include one or more of a central processing unit, an application processor, a graphic processing unit, an image signal processor, a sensor hub processor, or a communication processor.

For example, the memory may include a volatile memory (e.g., the volatile memory 132 of FIG. 1) or a nonvolatile memory (e.g., the nonvolatile memory 134 of FIG. 1).

For example, the interface may include a high definition multimedia interface (HDMI), a universal serial bus (USB) interface, an SD card interface, and/or an audio interface. For example, the interface may electrically or physically connect the electronic device 300 to an external electronic device, and may include a USB connector, a SD card/MMC connector, or an audio connector.

According to various embodiments, the battery 325 may be a device for supplying power to at least one element of the electronic device 300, and for example, may include a non-rechargeable primary cell, a rechargeable secondary cell, or a fuel cell. For example, at least a part of the battery 325 may be disposed on a plane surface substantially the same as the printed circuit board 324. The battery 325 may be integrally disposed inside the electronic device 300, or may be detachably/attachably disposed from/to the electronic device 300.

According to various embodiments, the antenna 327 may be disposed between the rear plate 328 and the battery 325. For example, the antenna 327 may include a near field communication (NFC) antenna, a wireless charging antenna, and/or a magnetic secure transmission (MST) antenna. For example, the antenna 327 may perform a short-range communication with an external device, or may wirelessly transmit/receive a power required for charging. In an embodiment, an antenna structure may be formed by a part of the side bezel structure 321 and/or the first support member 3211, or a combination thereof.

According to various embodiments, the electronic device 300 may have a bar type or plate type of exterior, but the exterior of the electronic device 300 may not be limited thereto. For example, the electronic device 300 may be a part of a foldable electronic device, a slidable electronic device, a stretchable electronic device, and/or a rollable electronic device.

Figure 4A:
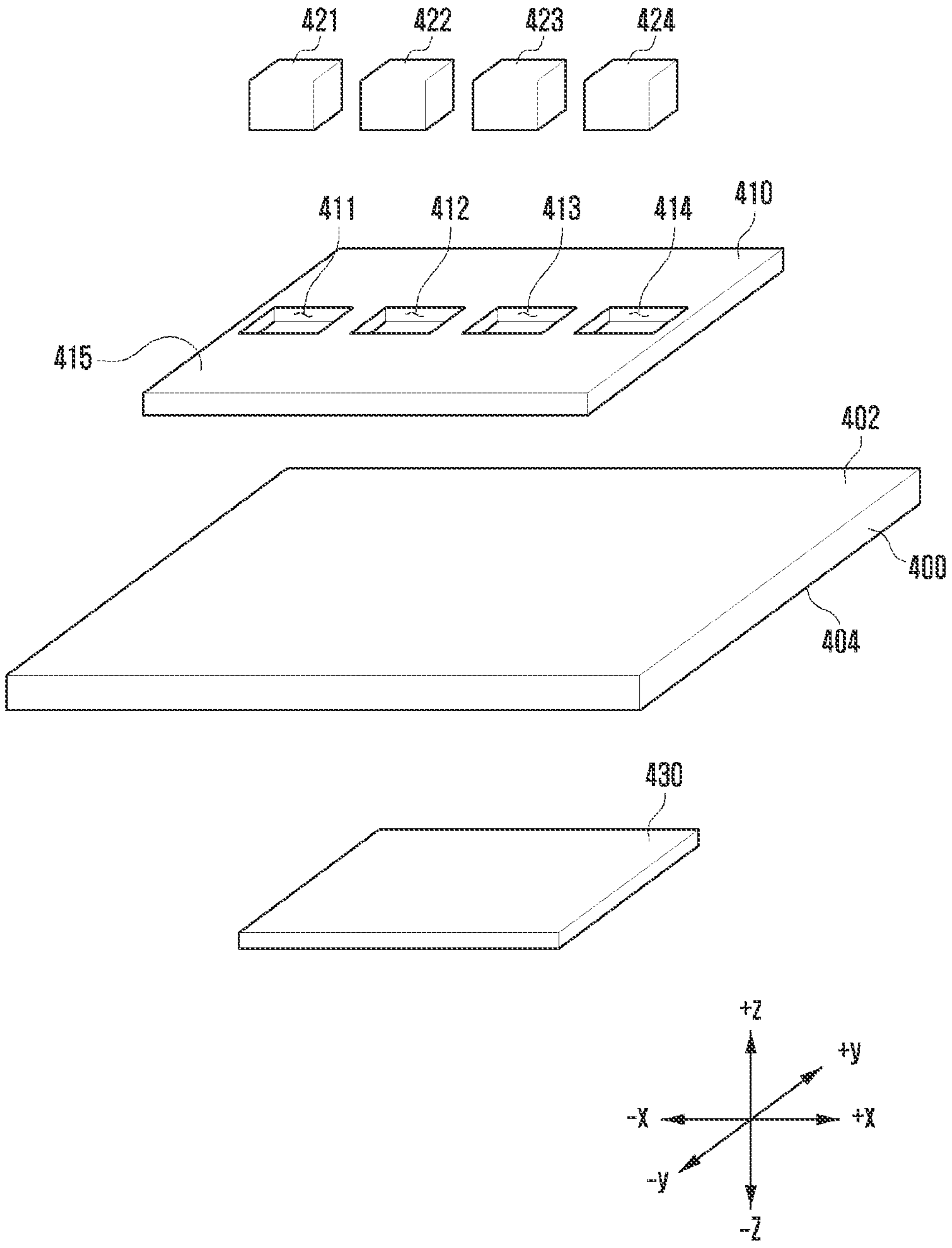
FIG. 4A and FIG. 4B are perspective views illustrating an example of a structure of an antenna module according to various embodiments.
Figure 4B:
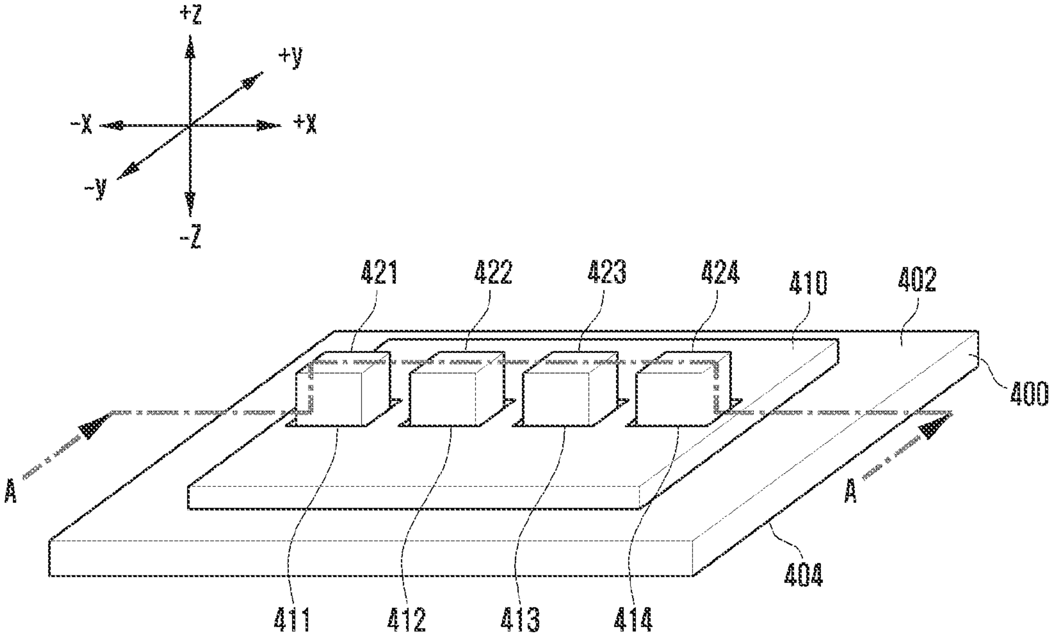

FIG. 4A and FIG. 4B are perspective views illustrating an example structure of an antenna module according to various embodiments. According to an embodiment, an antenna module of FIG. 4A and FIG. 4B may be at least partially similar to the third antenna module 246 of FIG. 2, and may include various embodiments of an antenna module.

According to various embodiments referring to FIG. 4A and FIG. 4B, an antenna module may include a first substrate 410, multiple antenna structures 421, 422, 423, and 424, and a wireless communication circuit 430.

According to various embodiments, the first substrate 410 may be disposed on a first surface 402 of a main substrate 400 (e.g., the printed circuit board 324 of FIG. 3C). According to an embodiment, the first substrate 410 may be electrically and/or physically connected to the main substrate 400. For example, the first substrate 410 may be coupled or connected to the first surface 402 of the main substrate 400. As an example, the first substrate 410 may be coupled or connected to the first surface 402 of the main substrate 400 through a conductive bonding method. For example, a conductive bonding method may include soldering, jet soldering, and/or an anisotropic conductive film (ACF). According to an embodiment, the first substrate 410 may have a permittivity different from that of the main substrate 400. For example, the first substrate 410 may have a permittivity lower than that of the main substrate 400.

According to various embodiments, the first substrate 410 may have multiple holes (e.g., through-holes 411, 412, 413, and 414) formed through at least a part of the first substrate 410. As used herein, the term "hole" may include a hole or any type of opening in the first substrate 410 that partially or fully passes through the first substrate 410 and includes a recess or other type of hole that may not extend fully through the first substrate 410. The term "hole" may include "groove", "cut-out portion", and the like. These terms may be regarded as meaning a certain region within the general plane of the substrate (or general contour of the substrate, if the substrate is not flat) in which the physical substance of the substrate is absent through the entire substrate thickness, thereby forming a space. In some examples, such a space may be located within an interior region of the plane of the substrate, forming a hole (of any suitable shape). In some examples, such a space may be located at an edge region of the substrate and/or at a corner region of the substrate (for example such that a part of the outer perimeter of the substrate has a concave shape at least partially surrounding the space) forming a "cut-out portion". According to an embodiment, each of the multiple antenna structures 421, 422, 423, and 424 may be disposed to extend through (or are inserted into) the multiple through-holes 411, 412, 413, and 414 of the first substrate 410, respectively. For example, in the case where the multiple antenna structures 421, 422, 423, and 424 are arranged inside the multiple through-holes 411, 412, 413, and 414 of the first substrate 410, respectively, at least parts thereof may be exposed outside the through-holes 411, 412, 413, and 414 of the first substrate 410, respectively. For example, the first substrate 410 may be electrically connected to the multiple antenna structures 421, 422, 423, and 424.

According to various embodiments, the first substrate 410 may include an electrical connection structure for electrically connecting the multiple antenna structures 421, 422, 423, and 424 arranged in the through-holes 411, 412, 413, and 414 and the main substrate 400. According to an embodiment, the first substrate 410 may provide an electrical connection between the first substrate 410 and/or various electronic components (e.g., the multiple antenna structures 421, 422, 423, and 424 and/or the main substrate 400) arranged outside thereof using an electrical connection structure (e.g., wires and conductive vias formed on and through a conductive layer). According to an embodiment, an electrical connection structure included in the first substrate 410 may include a matching element (e.g., 453, 459, 465, or 472 of FIG. 4C) for at least one antenna element (e.g., the 421-1, 422-1, 423-1, and/or 424-1 of FIG. 4C) included in each of the multiple antenna structures 421, 422, 423, and 424. For example, the matching element (e.g., 453, 459, 465, or 472 of FIG. 4C) may include at least one conductive pattern disposed on at least a part of multiple insulation layers of the first substrate 410. For example, the matching element may include at least one passive element disposed on a surface (or a substrate surface) (e.g., the first surface 415 of the first substrate 410) of the first substrate 410.

According to various embodiments, the multiple antenna structures 421, 422, 423, and 424 may include multiple antenna elements (e.g., the 421-1, 422-1, 423-1, and 424-1 of FIG. 4C) arranged at specific intervals to form a directional beam. According to an embodiment, each of the antenna structures 421, 422, 423, or 424 may include at least one antenna element disposed at a specific interval. According to an embodiment, the at least one antenna element included in each of the antenna structures 421, 422, 423, or 424 may be disposed on a surface of a rigid body of each of the antenna structures 421, 422, 423, or 424 or disposed therein. According to an embodiment, the multiple antenna elements included in the multiple antenna structures 421, 422, 423, and 424, as array antenna 420 (refer to FIG. 4C), may be set to form a beam pattern in a first direction (e.g., the z axis direction). For example, the multiple antenna structures 421, 422, 423, and 424 may have a permittivity different from that of the first substrate 410. As an example, the multiple antenna structures 421, 422, 423, and 424 may have a permittivity lower than that of the first substrate 410. For example, the multiple antenna structures 421, 422, 423, and 424 may be made of a material different from that of the first substrate 410. For example, the rigid body of the multiple antenna structures 421, 422, 423, and/or 424 may be made of ceramic or liquid crystal polymer (LCP).

According to various embodiments, the wireless communication circuit 430 may be disposed on a second surface 404 of the main substrate 400 (e.g., the printed circuit board 324 of FIG. 3C). According to an embodiment, the wireless communication circuit 430 may be electrically and/or physically connected to the main substrate 400. For example, the wireless communication circuit 430 may be coupled or connected to the second surface 404 of the main substrate 400.

According to various embodiments, the wireless communication circuit 430 may transmit and/or receive a wireless signal in a designated frequency band through the multiple antenna elements (e.g., the 421-1, 422-1, 423-1, and 424-1 of FIG. 4C) arranged on the multiple antenna structures 421, 422, 423, and 424. According to an embodiment, the wireless communication circuit 430 (e.g., the third RFIC 226 of FIG. 2) may be electrically connected to the multiple antenna elements (e.g., 421-1, 422-1, 423-1, and 424-1 of FIG. 4C) arranged on the multiple antenna structures 421, 422, 423, and 424 through the first substrate 410 and the main substrate 400. For an example, when transmitting, the wireless communication circuit 430 may up-convert a baseband signal obtained from a communication processor (e.g., the first communication processor 212 and/or the second communication processor 214 of FIG. 2) of an electronic device to an RF signal of a designated band. The RF signal may be delivered to the multiple antenna elements (e.g., the 421-1, 422-1, 423-1, and 424-1 of FIG. 4C) through the main substrate 400 and the first substrate 410. At time of receiving thereof, the wireless communication circuit 430 may down-convert an RF signal received through the multiple antenna elements (e.g., the 421-1, 422-1, 423-1, and 424-1 of FIG. 4C) to a baseband signal so as to deliver the baseband signal to the communication processor. As another example, when transmitting, the wireless communication circuit 430 may up-convert an IF signal (e.g., about 9 GHz-about 11 GHz) obtained from an intermediate frequency integrate circuit (IFIC) (e.g., the fourth RFIC 228 of FIG. 2) to an RF signal of a designated band. At the time of receiving, the wireless communication circuit 430 may down-convert an RF signal obtained through the multiple antenna elements (e.g., the 421-1, 422-1, 423-1, and 424-4 of FIG. 4C) (e.g., the array antenna 420) to an IF signal so as to deliver the IF signal to an IFIC.

According to various embodiments, the main substrate 400 may be disposed in a housing (e.g., the housing 310 of FIG. 3A) of an electronic device (e.g., the electronic device 300 of FIG. 3A). According to an embodiment, at least one circuit may be disposed on a surface (e.g., the first surface 402 and/or the second surface 404) of the main substrate 400. For example, a communication processor and/or a power management integrate circuit (PMIC) may be disposed on a first surface 402 (or the second surface 404) of the main substrate 400.

Figure 4C:
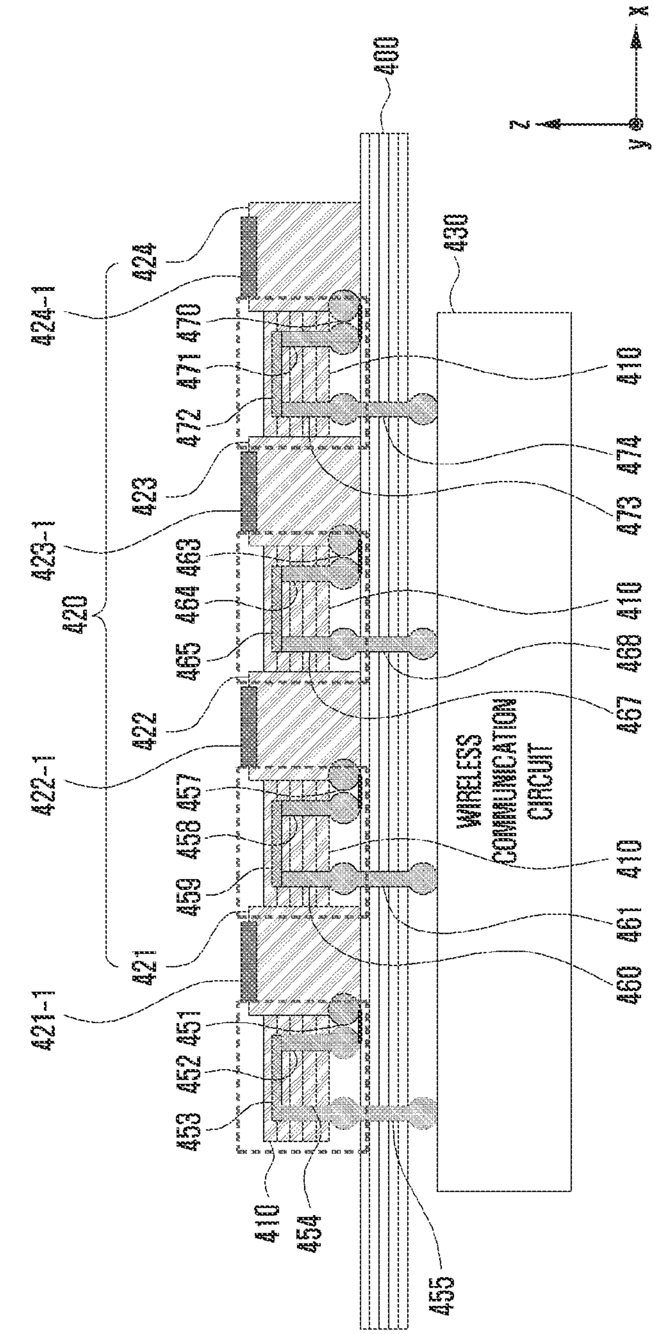
FIG. 4C is a cross sectional view of an antenna module seen from line A-A of FIG. 4B according to various embodiments.
Figure 4D:
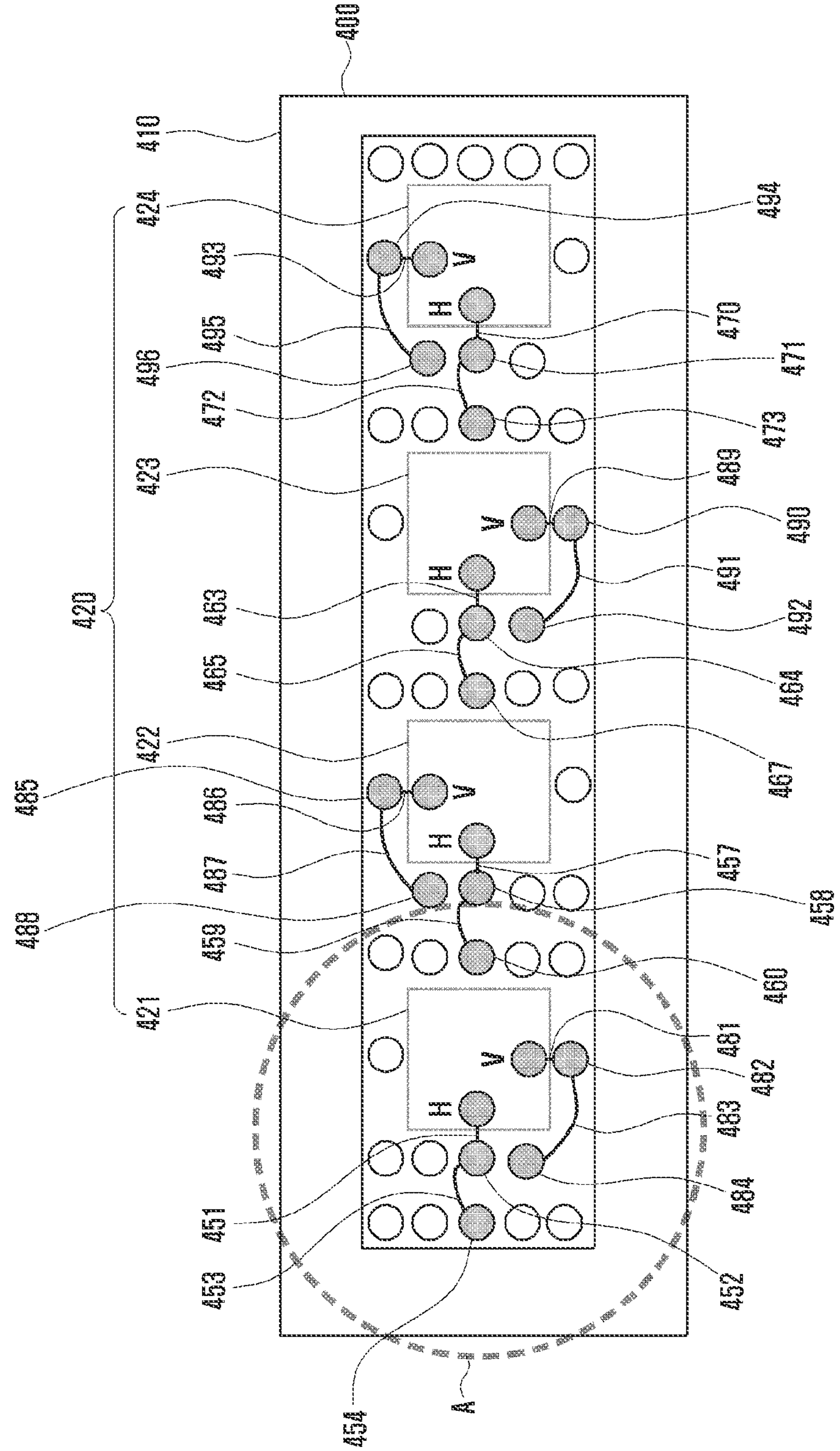
FIG. 4D is a plan view of an antenna module seen toward the −z axis direction of FIG. 4B according to various embodiments.
Figure 4E:
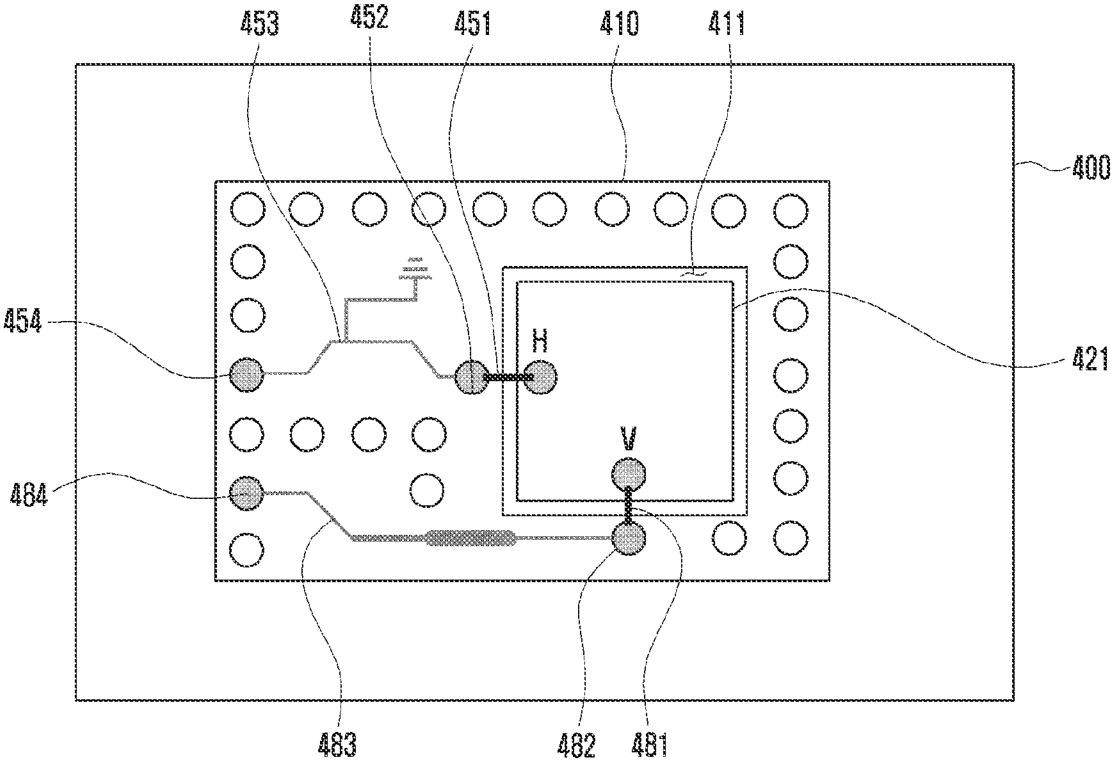
FIG. 4E is an enlarged plan view of region A of an antenna module of FIG. 4D according to various embodiments.

FIG. 4C is a cross sectional view of an antenna module seen from line A-A of FIG. 4B according to various embodiments. FIG. 4D is a plan view of an antenna module seen toward the −z axis direction of FIG. 4B according to various embodiments. FIG. 4E is an enlarged plan view of region A of an antenna module of FIG. 4D according to various embodiments.

According to various embodiments referring to FIG. 4C, FIG. 4D, and FIG. 4E, the multiple antenna structures 421, 422, 423, and 424 may be arranged in the through-holes 411, 412, 413, and 414 formed through at least a part of the first substrate 410, and may be coupled or connected to the first substrate 410 and/or the main substrate 400. According to an embodiment, the multiple antenna structures 421, 422, 423, and 424 may be coupled or connected to the first surface 402 of the main substrate 400 through a conductive bonding method. According to an embodiment, the multiple antenna structures 421, 422, 423, and 424 may be coupled or connected to the first substrate 410 through a conductive bonding method. In the case, the multiple antenna structures 421, 422, 423, and 424 may not be electrically connected to the main substrate 400. According to an embodiment, when the first surface 402 of the main substrate 400 is seen from above (when seen toward the −z axis direction), as illustrated in FIG. 4D, the multiple antenna structures 421, 422, 423, and 424 may be arranged in the through-holes 411, 412, 413, and 414 of the first substrate 410.

According to various embodiments, the first substrate 410 may include an electrical connection structure configured to electrically connect the multiple antenna elements 421-1, 422-1, 423-1, and 424-1 included in the multiple antenna structures 421, 422, 423, and 424 and the main substrate 400 (or the wireless communication circuit 430). According to an embodiment, an electrical connection structure included in the first substrate 410 may include a matching element 453, 459, 465, or 472 for the antenna elements 421-1, 422-1, 423-1, or 424-1 included in each of the multiple antenna structures 421, 422, 423, and 424. For example, the matching element 453, 459, 465, or 472 may perform a function for matching an impedance of the antenna element 421-1, 422-1, 423-1, or 424-1 electrically connected thereto. According to an embodiment, a first antenna element 421-1 disposed on a first antenna structure 421 may be electrically connected to a first matching element 453 through a first electrical wire 451 and a first via 452. The first matching element 453 may be electrically connected to a third via 455 of the main substrate 400 through a second via 454. According to an embodiment, a second antenna element 422-1 disposed on a second antenna structure 422 may be electrically connected to a second matching element 459 through a second electrical wire 457 and a fifth via 458. The second matching element 459 may be electrically connected to a seventh via 461 of the main substrate 400 through a sixth via 460. According to an embodiment, a third antenna element 423-1 disposed on a third antenna structure 423 may be electrically connected to a third matching element 465 through a third electrical wire 463 and a ninth via 464. The third matching element 465 may be electrically connected to an eleventh via 468 of the main substrate 400 through a tenth via 467. According to an embodiment, a fourth antenna element 424-1 disposed on a fourth antenna structure 424 may be electrically connected to a fourth matching element 472 through a fourth electrical wire 470 and a thirteenth via 471. The fourth matching element 472 may be electrically connected to a fifteenth via 474 of the main substrate 400 through a fourteenth via 473. In the present disclosure, a "via" (e.g. when referring to an "nth via" where n is an integer label distinguishing between different vias) may be understood as meaning a component (e.g. a wire or other portion of conductive material) providing a connection (e.g. an electrical connection) between two or more other elements, components, circuits, and the like. Such a connection may be provided through a further element or component.

According to various embodiments, the wireless communication circuit 430 may be electrically connected to the first substrate 410 through the main substrate 400. According to an embodiment, the wireless communication circuit 430 may be electrically connected to a first matching element 453 of the first substrate 410 through the third via 455 of the main substrate 400 and the second via 454 of the first substrate 410. According to an embodiment, the wireless communication circuit 430 may be electrically connected to a second matching element 459 of the first substrate 410 through the seventh via 461 of the main substrate 400 and the sixth via 460 of the first substrate 410. According to an embodiment, the wireless communication circuit 430 may be electrically connected to the third matching element 465 of the first substrate 410 through the eleventh via 468 of the main substrate 400 and the tenth via 467 of the first substrate 410. According to an embodiment, the wireless communication circuit 430 may be electrically connected to the fourth matching element 472 of the first substrate 410 through the fifteenth via 474 of the main substrate 400 and the fourteenth via 473 of the first substrate 410. As an example, the wireless communication circuit 430 may transmit and/or receive an RF signal to and/or from the multiple antenna elements 421-1, 422-1, 423-1, and 424-1 included in the multiple antenna structures 421, 422, 423, 424 which are electrically connected through the first substrate 410 and the main substrate 400. As an example, the first electrical wire 451, the second electrical wire 457, the third electrical wire 463, and/or the fourth electrical wire 470 may include a conductive pattern disposed on a surface of the first substrate 410 and/or a surface (e.g., the first surface 402) of the main substrate 400.

According to various embodiments, the multiple antenna structures 421, 422, 423, and 424 may transmit and/or receive an RF signal of a first polarization (e.g., a horizontal polarization) and/or an RF signal of a second polarization (e.g., a vertical polarization) perpendicular to the first polarization. According to an embodiment, the first substrate 410 may include an electrical connection structure for a first polarization and a second polarization of the multiple antenna elements 421-1, 422-1, 423-1, and 424-1 included in the multiple antenna structures 421, 422, 423, and 424. For example, an electrical connection structure of the first substrate 410 may include the first electrical wire 451, the first via 452, and the first matching element 453 in order for a first polarization H of the first antenna element 421-1 disposed on the first antenna structure 421. As an example, the first antenna element 421-1 may be electrically connected to the first electrical wire 451, the first via 452, and the first matching element 453 of the first substrate 410 in order to transmit and/or receive a signal of the first polarization. An electrical connection structure of the first substrate 410 may include a fifth electrical wire 481, a seventeenth via 482, and the fifth matching element 483 in order for a second polarization V of the first antenna element 421-1. As an example, the first antenna element 421-1 may be electrically connected to the fifth electrical wire 481, the seventeenth via 482, and the fifth matching element 483 of the first substrate 410 in order to transmit and/or receive a signal of a second polarization. As an example, the fifth matching element 483 may be electrically connected to the main substrate 400 through an eighteenth via 484. As an example, as illustrated in FIG. 4E, the first matching element 453 and/or the fifth matching element 483 may include at least one conductive pattern disposed on at least a part of multiple insulation layers of the first substrate 410.

For example, an electrical connection structure of the first substrate 410 may include the second electrical wire 457, the fifth via 458, and the second matching element 459 in order for a first polarization H of the second antenna element 422-1 disposed on the second antenna structure 422. As an example, the second antenna element 422-1 may be electrically connected to the second electrical wire 457, the fifth via 458, and the second matching element 459 of the first substrate 410 in order to transmit and/or receive a signal of a first polarization. An electrical connection structure of the first substrate 410 may include a sixth electrical wire 485, a nineteenth via 486, and a sixth matching element 487 in order for a second polarization V of the second antenna element 422-1. As an example, the second antenna element 422-1 may be electrically connected to the sixth electrical wire 485, the nineteenth via 486, and the sixth matching element 487 of the first substrate 410 in order to transmit and/or receive a signal of a second polarization. As an example, the sixth matching element 487 may be electrically connected to the main substrate 400 through a twentieth via 488. As an example, the second matching element 459 and/or the sixth matching element 487 may include at least one conductive pattern disposed on at least a part of multiple insulation layers of the first substrate 410.

For example, an electrical connection structure of the first substrate 410 may include the third electrical wire 463, the ninth via 464, and the third matching element 465 in order for a first polarization H of the third antenna element 423-1 disposed on the third antenna structure 423. As an example, the third antenna element 423-1 may be electrically connected to the third electrical wire 463, the ninth via 464, and the third matching element 465 of the first substrate 410 in order to transmit and/or receive a signal of a first polarization. An electrical connection structure of the first substrate 410 may include a seventh electrical wire 489, a twenty-first via 490, and a seventh matching element 491 in order for a second polarization V of the third antenna element 423-1. As an example, the third antenna element 423-1 may be electrically connected to the seventh electrical wire 489, the twenty-first via 490, and the seventh matching element 491 of the first substrate 410 in order to transmit and/or receive a signal of a second polarization. As an example, the seventh matching element 491 may be electrically connected to the main substrate 400 through a twenty-second via 492. As an example, the third matching element 465 and/or the seventh matching element 491 may include at least one conductive pattern disposed on at least a part of multiple insulation layers of the first substrate 410.

For example, an electrical connection structure of the first substrate 410 may include the fourth electrical wire 470, the thirteenth via 471, and the fourth matching element 472 in order for a first polarization H of the fourth antenna element 424-1 disposed on the fourth antenna structure 424. As an example, the fourth antenna element 424-1 may be electrically connected to the fourth electrical wire 470, the thirteenth via 471, and the fourth matching element 472 of the first substrate 410 in order to transmit and/or receive a signal of a first polarization. An electrical connection structure of the first substrate 410 may include an eighth electrical wire 493, a twenty-third via 494, and an eighth matching element 495 in order for a second polarization V of the fourth antenna element 424-1. As an example, the fourth antenna element 424-1 may be electrically connected to the eighth electrical wire 493, the twenty-third via 494, and the eighth matching element 495 of the first substrate 410 in order to transmit and/or receive a signal of a second polarization. As an example, the eighth matching element 495 may be electrically connected to the main substrate 400 through a twenty-fourth via 496. As an example, the fourth matching element 472 and/or the eighth matching element 493 may include at least one conductive pattern disposed on at least a part of multiple insulation layers of the first substrate 410.

Figure 4F:
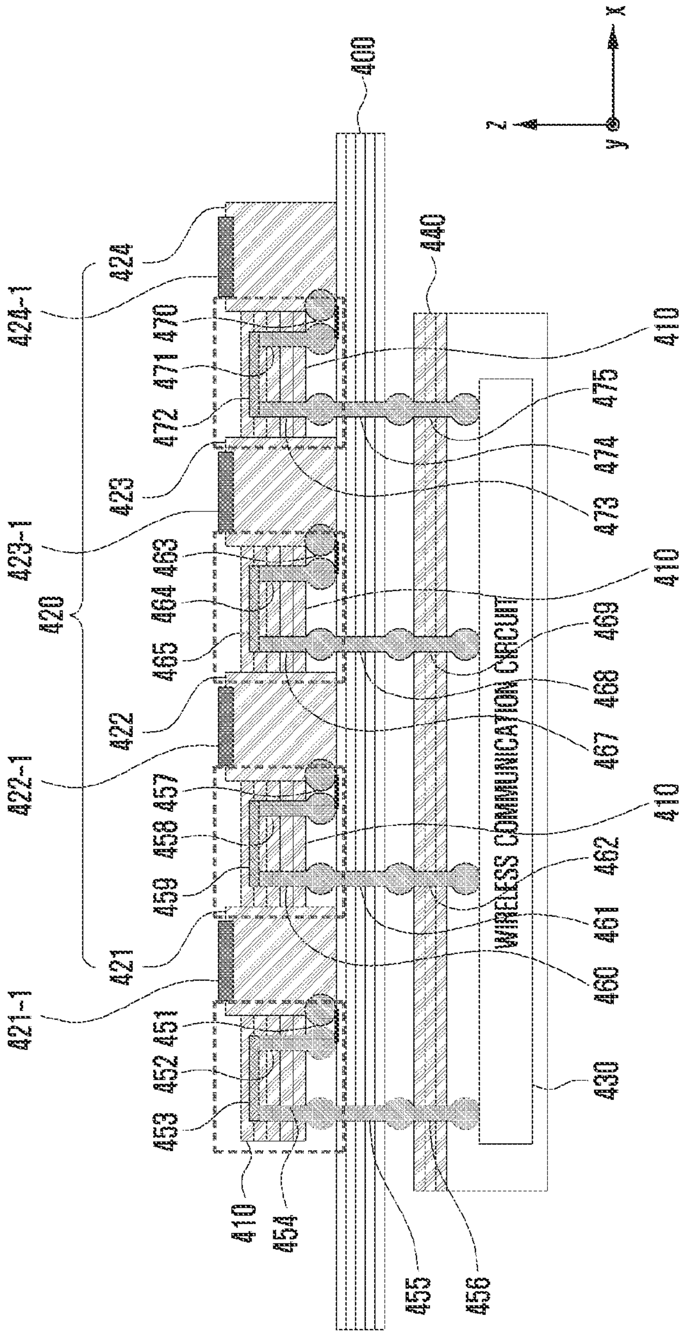
FIG. 4F is a cross sectional view illustrating an example of a wireless communication circuit disposed in an antenna module according to various embodiments.

FIG. 4F is a cross sectional view illustrating an example of a wireless communication circuit disposed in an antenna module according to various embodiments.

According to various embodiments referring to FIG. 4F, an antenna module may include a first substrate 410, a multiple antenna structures 421, 422, 423, and 424, a second substrate 440, and a wireless communication circuit 430 disposed on a second substrate 440. According to an embodiment, in order to avoid overlapping descriptions with FIG. 4C, detailed descriptions for the first substrate 410 and the multiple antenna structures 421, 422, 423, and 424 of FIG. 4F will be omitted.

According to various embodiments, the second substrate 440 may be disposed on the second surface 404 of the main substrate 400 (e.g., the printed circuit board 324 of FIG. 3C). According to an embodiment, the second substrate 440 may be electrically and/or physically connected to the main substrate 400. For example, the second substrate 440 may be coupled or connected to the second surface 404 of the main substrate 400. According to an embodiment, the second substrate 440 may have a permittivity different from that of the main substrate 400. For example, the second substrate 440 may have a permittivity lower than that of the main substrate 400.

According to various embodiments, the wireless communication circuit 430 may be disposed on the second substrate 440. According to an embodiment, the wireless communication circuit 430 may be electrically connected to the first substrate 410 through the second substrate 440 and the main substrate 400. For example, the wireless communication circuit 430 may be electrically connected to a first matching element 453 of the first substrate 410 through a fourth via 456 of the second substrate 440, a third via 455 of the main substrate 400, and a second via 454 of the first substrate 410. For example, the wireless communication circuit 430 may be electrically connected to a second matching element 459 of the first substrate 410 through an eighth via 462 of the second substrate 440, a seventh via 461 of the main substrate 400, and sixth via 460 of the first substrate 410. For example, the wireless communication circuit 430 may be electrically connected to a third matching element 465 of the first substrate 410 through a twelfth via 469 of the second substrate 440, an eleventh via 468 of the main substrate 400, and a tenth via 467 of the first substrate 410. For example, the wireless communication circuit 430 may be electrically connected to a fourth matching element 472 of the first substrate 410 through a sixteenth via 475 of the second substrate 440, a fifteenth via 474 of the main substrate 400, and a fourteenth via 473 of the first substrate 410. As an example, the wireless communication circuit 430 may transmit and/or receive an RF signal to and/or from the multiple antenna elements 421-1, 422-1, 423-1, and 424-1 included in the multiple antenna structures 421, 422, 423, 424 which are electrically connected through the first substrate 410, the second substrate 440, and the main substrate 400.

According to various embodiments, the multiple antenna elements 421-1, 422-1, 423-1, and 424-1 included in the multiple antenna structures 421, 422, 423, and 424 may be electrically connected to the wireless communication circuit 430 through main substrate 400. According to an embodiment, the main substrate 400 may include an electrical connection structure for electrically connecting the multiple antenna structures 421, 422, 423, and 424, which are arranged in the through-holes 411, 412, 413, and 414 of the first substrate 410, and the wireless communication circuit 430. According to an embodiment, the matching elements 453, 459, 465, and/or 472 included in the first substrate 410 may be electrically connected to at least a part of an electrical connection structure for electrically connecting the multiple antenna structures 421, 422, 423, and 424 and the wireless communication circuit 430.

According to various embodiments, the electronic device 101 or 300 may have the multiple antenna structures 421, 422, 423, and 424 arranged in the through-holes 411, 412, 413, and 414 which are formed through at least a part of the first substrate 410, to relatively reduce a space (e.g., a height) required for an antenna module and relatively improve mechanical rigidity of an antenna module.

According to various embodiments, the electronic device 101 or 300 may have the multiple antenna structures 421, 422, 423, and 424 arranged in the through-holes 411, 412, 413, and 414 which are formed through at least a part of the first substrate 410, so that the height of the first substrate 410 is set relatively high. In the case, the first substrate 410 may be configured to increase the distance between a matching element and a ground in within a first range (e.g., about 60%) of the height of the multiple antenna structures 421, 422, 423, and 424, so as to reduce a loss of the matching element.

Figure 5A:
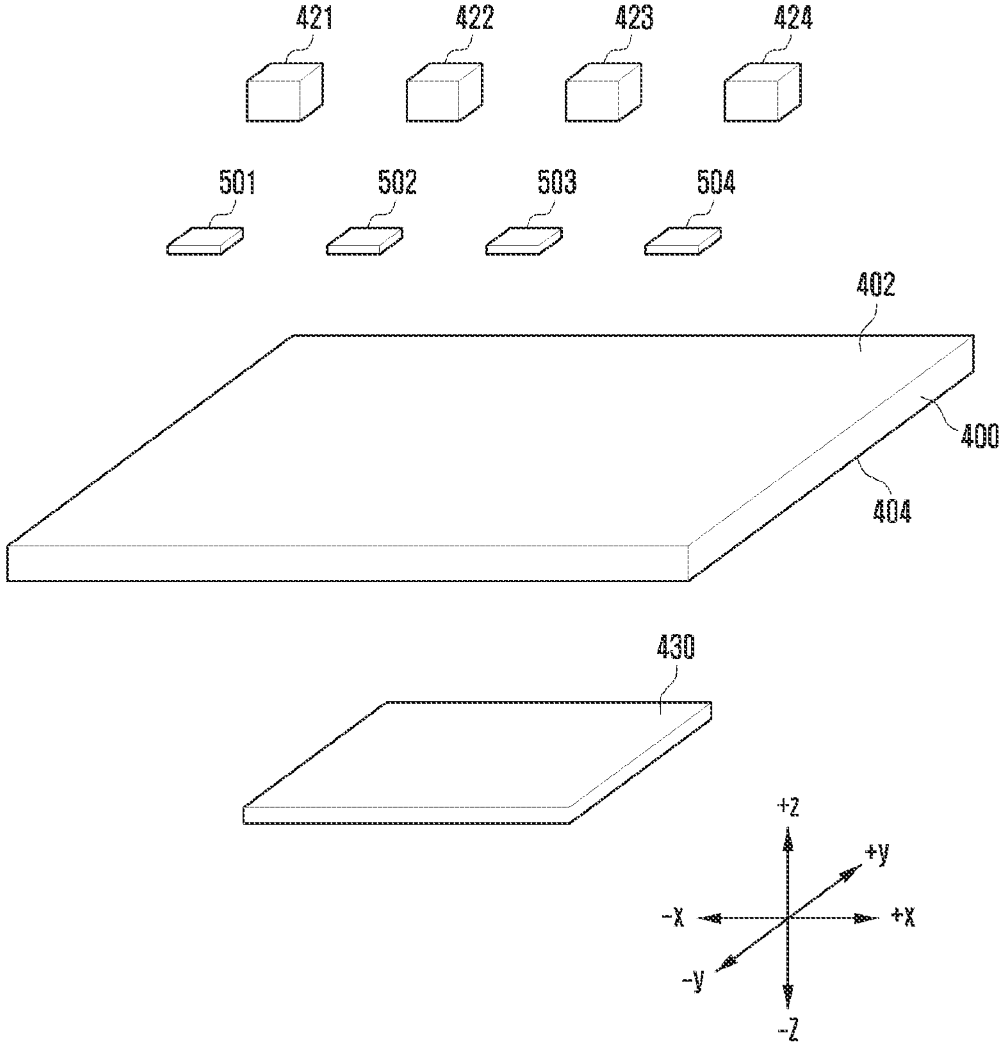
FIG. 5A and FIG. 5B are perspective views illustrating another example of a structure of an antenna module according to various embodiments.
Figure 5B:
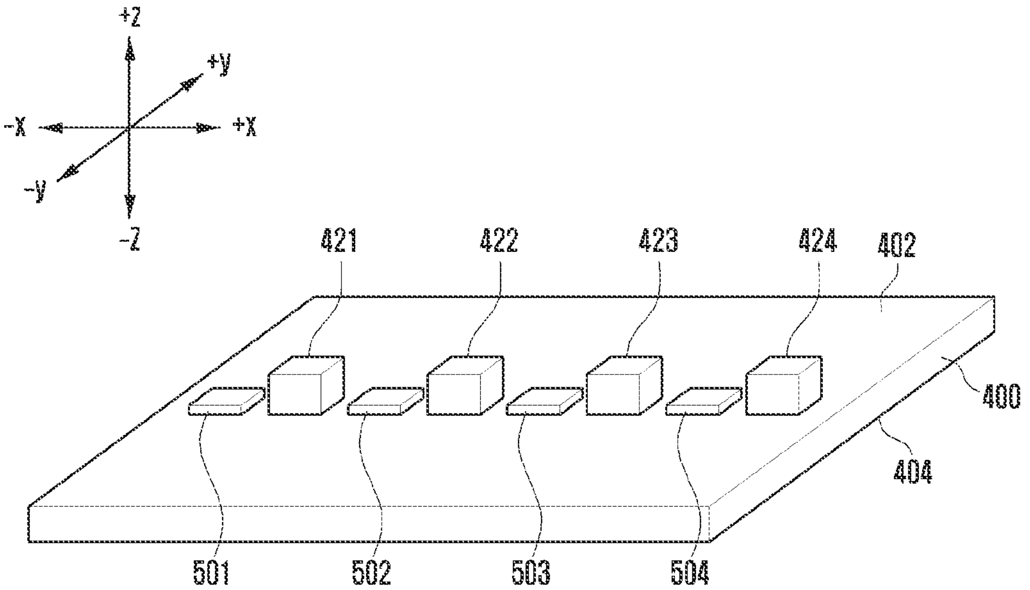

FIG. 5A and FIG. 5B are perspective views illustrating another example of a structure of an antenna module according to various embodiments. According to an embodiment, an antenna module of FIG. 5A and FIG. 5B may be at least partially similar to the third antenna module 246 of FIG. 2, and may include various embodiments of an antenna module.

According to various embodiments referring to FIG. 5A and FIG. 5B, an antenna module may include multiple sub substrates 501, 502, 503, and 504, multiple antenna structures 421, 422, 423, and 424, and a wireless communication circuit 430. For example, the multiple antenna structures 421, 422, 423, and 424 and the wireless communication circuit 430 of FIG. 5A and FIG. 5B may be operate similar to the multiple antenna structures 421, 422, 423, and 424 and the wireless communication circuit 430 of FIG. 4A and FIG. 4B. Therefore, in connection with the descriptions of FIG. 5A and FIG. 5B, in order to avoid overlapping descriptions with FIG. 4A and FIG. 4B, detailed descriptions for the multiple antenna structures 421, 422, 423, and 424 and the wireless communication circuit 430 may not be repeated.

According to various embodiments, the multiple sub substrates 501, 502, 503, and 504 may be arranged on a first surface 402 of a main substrate 400 (e.g., the printed circuit board 324 of FIG. 3C). According to an embodiment, the multiple sub substrates 501, 502, 503, and 504 may be electrically and/or physically connected to the main substrate 400. For example, the multiple sub substrates 501, 502, 503, and 504 may be coupled or connected to the first surface 402 of the main substrate 400 through a conductive bonding method. According to an embodiment, the multiple sub substrates 501, 502, 503, and 504 may have a permittivity different from that of the main substrate 400. For example, the multiple sub substrates 501, 502, 503, and 504 may have a permittivity lower than that of the main substrate 400.

According to various embodiments, the multiple sub substrates 501, 502, 503, and 504 may be arranged adjacent to the multiple antenna structures 421, 422, 423, and 424 on the first surface of the main substrate 400. According to an embodiment, a first sub substrate 501 may be disposed adjacent to a first antenna structure 421. For example, the first sub substrate 501 may be electrically connected to the first antenna structure 421. According to an embodiment, a second sub substrate 502 may be disposed adjacent to a second antenna structure 422. For example, the second sub substrate 502 may be electrically connected to the second antenna structure 422. According to an embodiment, a third sub substrate 503 may be disposed adjacent to a third antenna structure 423. For example, the third sub substrate 503 may be electrically connected to the third antenna structure 423. According to an embodiment, a fourth sub substrate 504 may be disposed adjacent to a fourth antenna structure 424. For example, the fourth sub substrate 504 may be electrically connected to the fourth antenna structure 424.

According to various embodiments, the multiple sub substrates 501, 502, 503, and 504 may include an electrical connection structure for electrically connecting the multiple antenna structures 421, 422, 423, and 424 which are arranged adjacent to each other and the main substrate 400. According to an embodiment, the first sub substrate 501 may provide an electrical connection between the first sub substrate 501 and/or various electronic components (e.g., the first antenna structure 421 and/or the main substrate 400) arranged outside thereof using an electrical connection structure (e.g., wires and conductive vias formed on and through a conductive layer). For example, an electrical connection structure included in the first sub substrate 501 may include a matching element (e.g., the ninth matching element 513 and/or the tenth matching element 517 of FIG. 5C) for at least one antenna element (e.g., the first antenna element 421-1 of FIG. 4C) included in the first antenna structure 421. As an example, the matching element may include at least one conductive pattern disposed on at least a part of multiple insulation layers of the first sub substrate 501. For example, the matching element may include at least one passive element disposed on a surface (or a substrate surface) of the first sub substrate 501.

According to an embodiment, a second sub substrate 502 may provide an electrical connection between the second sub substrate 502 and/or various electronic components (e.g., the second antenna structure 422 and/or the main substrate 400) arranged outside thereof using an electrical connection structure. For example, an electrical connection structure included in the second sub substrate 502 may include a matching element (e.g., the eleventh matching element 523 and/or the twelfth matching element twelfth matching element 527 of FIG. 5C) for at least one antenna element (e.g., the second antenna element 422-1 of FIG. 4C) included in the second antenna structure 422.

According to an embodiment, a third sub substrate 503 may provide an electrical connection between the third sub substrate 503 and/or various electronic components (e.g., the third antenna structure 423 and/or the main substrate 400) arranged outside thereof using an electrical connection structure. For example, an electrical connection structure included in the third sub substrate 503 may include a matching element (e.g., the thirteen matching element 533 and/or the fourteenth matching element 537 of FIG. 5C) for at least one antenna element (e.g., the third antenna element 423-1 of FIG. 4C) included in the third antenna structure 423.

According to an embodiment, a fourth sub substrate 504 may provide an electrical connection between the fourth sub substrate 504 and/or various electronic components (e.g., the fourth antenna structure 424 and/or the main substrate 400) arranged outside thereof using an electrical connection structure. For example, an electrical connection structure included in the fourth sub substrate 504 may include a matching element (e.g., the fifteenth matching element 543 and/or the sixteenth matching element 547 of FIG. 5C) for at least one antenna element (e.g., the fourth antenna element 424-1 of FIG. 4C) included in the fourth antenna structure 424.

Figure 5C:
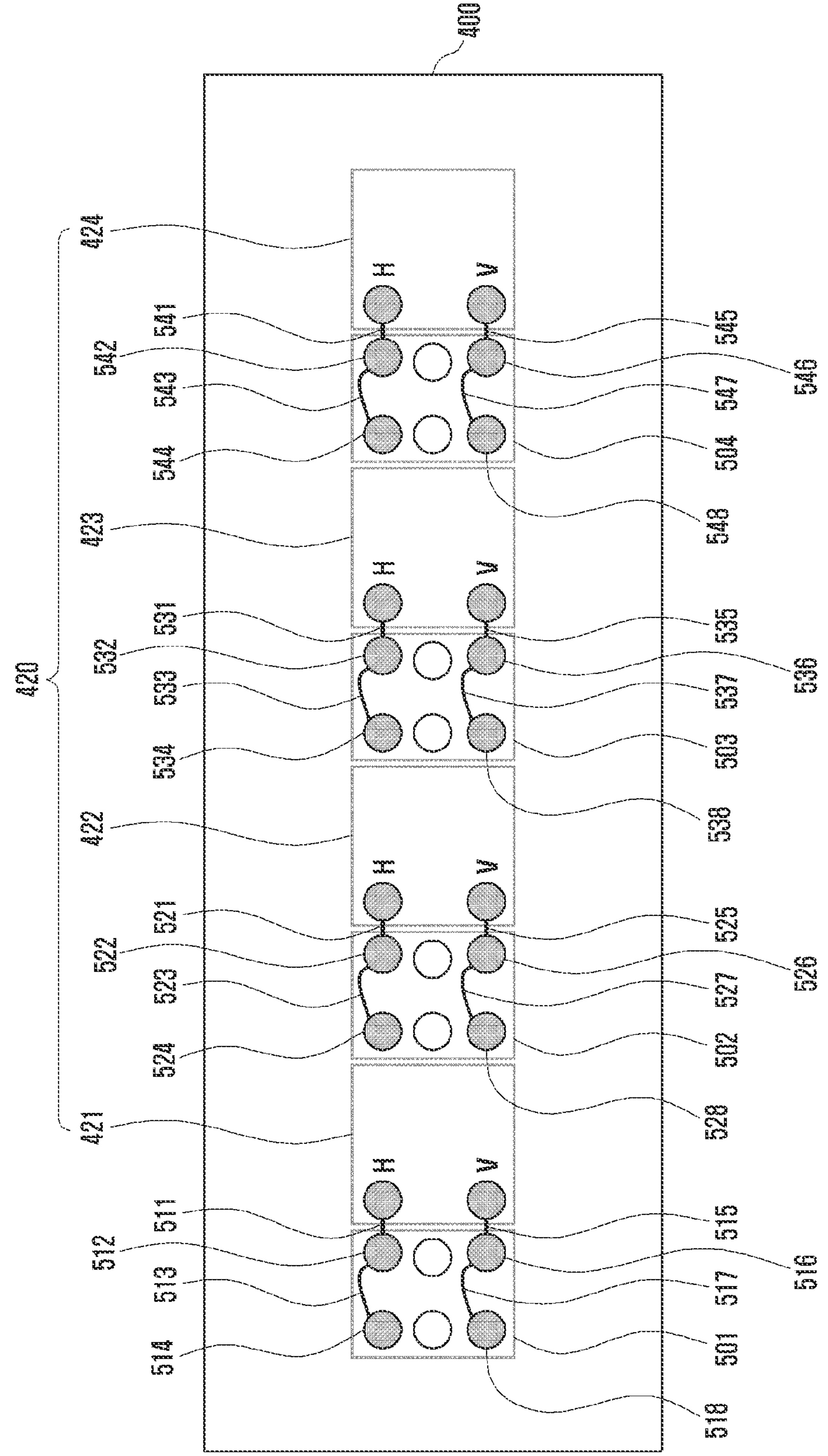
FIG. 5C is a plan view of an antenna module seen toward the −z axis direction of FIG. 5B according to various embodiments.

FIG. 5C is a plan view of an antenna module seen toward the −z axis direction of FIG. 5B according to various embodiments.

According to various embodiments referring to FIG. 5C, the multiple antenna structures 421, 422, 423, and 424 may be arranged adjacent to the multiple sub substrates 501, 502, 503, and 504 on the first surface 402 of the main substrate 400. According to an embodiment, when the first surface 402 of the main substrate 400 is seen from above (when seen toward the −z axis direction), the multiple antenna structures 421, 422, 423, and 424 may be alternately arranged with the multiple sub substrates 501, 502, 503, and 504.

According to various embodiments, the multiple sub substrates 501, 502, 503, and 504 may include an electrical connection structure configured to electrically connect the multiple antenna elements 421-1, 422-1, 423-1, and 424-1 included in the multiple antenna structures 421, 422, 423, and 424 and the main substrate 400 (or the wireless communication circuit 430). According to an embodiment, the first sub substrate 501 may include an electrical connection structure for a first polarization and a second polarization of the first antenna element 421-1 included in the first antenna structure 421. For example, the first antenna element 421-1 may be electrically connected to a ninth matching element 513 through a ninth electrical wire 511 and a twenty-fifth via 512 in order for a signal the first polarization. The ninth matching element 513 may be electrically connected to the main substrate 400 (e.g., the third via 455) through a twenty-sixth via 514. For example, the first antenna element 421-1 may be electrically connected to a tenth matching element 517 through a tenth electrical wire 515 and a twenty-seventh via 516 in order for a signal the second polarization. The tenth matching element 517 may be electrically connected to the main substrate 400 through a twenty-eighth via 518. As an example, the ninth matching element 513 and/or the tenth matching element 517 may include at least one conductive pattern disposed on at least a part of multiple insulation layers of the first sub substrate 501. As an example, the ninth electrical wire 511 and/or the tenth electrical wire 515 may include a conductive pattern disposed on a surface of the first sub substrate 501 and/or a surface (e.g., the first surface 402) of the main substrate 400.

According to an embodiment, the second sub substrate 502 may include an electrical connection structure for a first polarization and a second polarization of the second antenna element 422-1 included in the second antenna structure 422. For example, the second antenna element 422-1 may be electrically connected to an eleventh matching element 523 through an eleventh electrical wire 521 and a twenty-ninth via 522 in order for a signal the first polarization. The eleventh matching element 523 may be electrically connected to the main substrate 400 (e.g., the seventh via 461) through a thirtieth via 524. For example, the second antenna element 422-1 may be electrically connected to a twelfth matching element 527 through a twelfth electrical wire 525 and a thirty-first via 526 in order for a signal the second polarization. The twelfth matching element 527 may be electrically connected to the main substrate 400 through a thirty-second via 528. As an example, the eleventh matching element 523 and/or the twelfth matching element 527 may include at least one conductive pattern disposed on at least a part of multiple insulation layers of the second sub substrate 502. As an example, the eleventh electrical wire 521 and/or the twelfth electrical wire 525 may include a conductive pattern disposed on a surface of the second sub substrate 502 and/or a surface (e.g., the first surface 402) of the main substrate 400.

According to an embodiment, the third sub substrate 503 may include an electrical connection structure for a first polarization and a second polarization of the third antenna element 423-1 included in the third antenna structure 423. For example, the third antenna element 423-1 may be electrically connected to a thirteen matching element 533 through a thirteen electrical wire 531 and a thirty-third via 532 in order for a signal the first polarization. The thirteen matching element 533 may be electrically connected to the main substrate 400 (e.g., the eleventh via 468) through a thirty-fourth via 534. For example, the third antenna element 423-1 may be electrically connected to a fourteenth matching element 537 through a fourteenth electrical wire 535 and a thirty-fifth via 536 in order for a signal the second polarization. The fourteenth matching element 537 may be electrically connected to the main substrate 400 through a thirty-sixth via 538. As an example, the thirteen matching element 533 and/or the fourteenth matching element 537 may include at least one conductive pattern disposed on at least a part of multiple insulation layers of the third sub substrate 503. As an example, the thirteen electrical wire 531 and/or the fourteenth electrical wire 535 may include a conductive pattern disposed on a surface of the third sub substrate 503 and/or a surface (e.g., the first surface 402) of the main substrate 400.

According to an embodiment, the fourth sub substrate 504 may include an electrical connection structure for a first polarization and a second polarization of the fourth antenna element 424-1 included in the fourth antenna structure 424. For example, the fourth antenna element 424-1 may be electrically connected to a fifteenth matching element 543 through a fifteenth electrical wire 541 and a thirty-seventh via 542 in order for a signal the first polarization. The fifteenth matching element 543 may be electrically connected to the main substrate 400 (e.g., the fifteenth via 474) through a thirty-eighth via 544. For example, the fourth antenna element 424-1 may be electrically connected to a sixteenth matching element 547 through a sixteenth electrical wire 545 and a thirty-ninth via 546 in order for a signal the second polarization. The sixteenth matching element 547 may be electrically connected to the main substrate 400 through a fortieth via 548. As an example, the fifteenth matching element 543 and/or the sixteenth matching element 547 may include at least one conductive pattern disposed on at least a part of multiple insulation layers of the fourth sub substrate 504. As an example, the fifteenth electrical wire 541 and/or the sixteenth electrical wire 545 may include a conductive pattern disposed on a surface of the fourth sub substrate 504 and/or a surface (e.g., the first surface 402) of the main substrate 400.

According to various example embodiments, an electronic device (e.g., the electronic device 101 of FIG. 1 or FIG. 2, or the electronic device 300 of FIG. 3A to FIG. 3C) may include: a housing (e.g., the housing 310 of FIG. 3A), a main substrate (e.g., the main substrate 400 of FIG. 5A) disposed in an inner space of the housing and including a first surface (e.g., the first surface 402 FIG. 5A) facing a first direction and a second surface (e.g., the second surface 404 of FIG. 5A) facing a second direction opposite to the first direction, multiple antenna structures (e.g., the multiple antenna structures 421, 422, 423, and 424 of FIG. 5A) including at least one antenna element comprising an antenna (e.g., the antenna element 421-1, 422-1, 423-1, and/or 424-1 of FIG. 5A) spaced and disposed at a designated interval on the first surface of the main substrate, and multiple sub substrates (e.g., the multiple sub substrates 501, 502, 503, and/or 504 of FIG. 5A) arranged adjacent to the multiple antenna structures on the first surface of the main substrate, wherein the multiple sub substrates include a matching structure comprising impedance matching circuitry configured to match impedance of (e.g., the matching elements 513, 517, 523, 527, 533, 537, 543, and/or 547 of FIG. 5C) the at least one antenna element included in each of the multiple antenna structures.

According to various example embodiments, each of the multiple antenna structures may include a rigid body and the at least one antenna element included in the rigid body, and the rigid body and the multiple sub substrates may have different permittivities.

According to various example embodiments, the multiple sub substrates may include an electrical connection structure comprising conductive material configured to electrically connect the at least one antenna element and the main substrate.

According to various example embodiments, the matching structure may include at least one conductive pattern disposed on at least one insulation layer on each of the multiple sub substrates.

According to various example embodiments, the matching structure may include a passive element disposed on each of the multiple sub substrates.

According to various example embodiments, the electronic device may further comprise: a wireless communication circuit (e.g., the wireless communication circuit 430 of FIG. 5A) disposed on the second surface of the main substrate, electrically connected to the multiple sub substrates through the main substrate, and configured to transmit and/or receive a wireless signal in a designated frequency band through at least one antenna element included in each of the multiple antenna structures.

According to various example embodiments, the multiple sub substrates may be coupled or connected to the main substrate, and the multiple antenna structures may be coupled or connected to the multiple sub substrates and/or the main substrate.

Figure 6A:
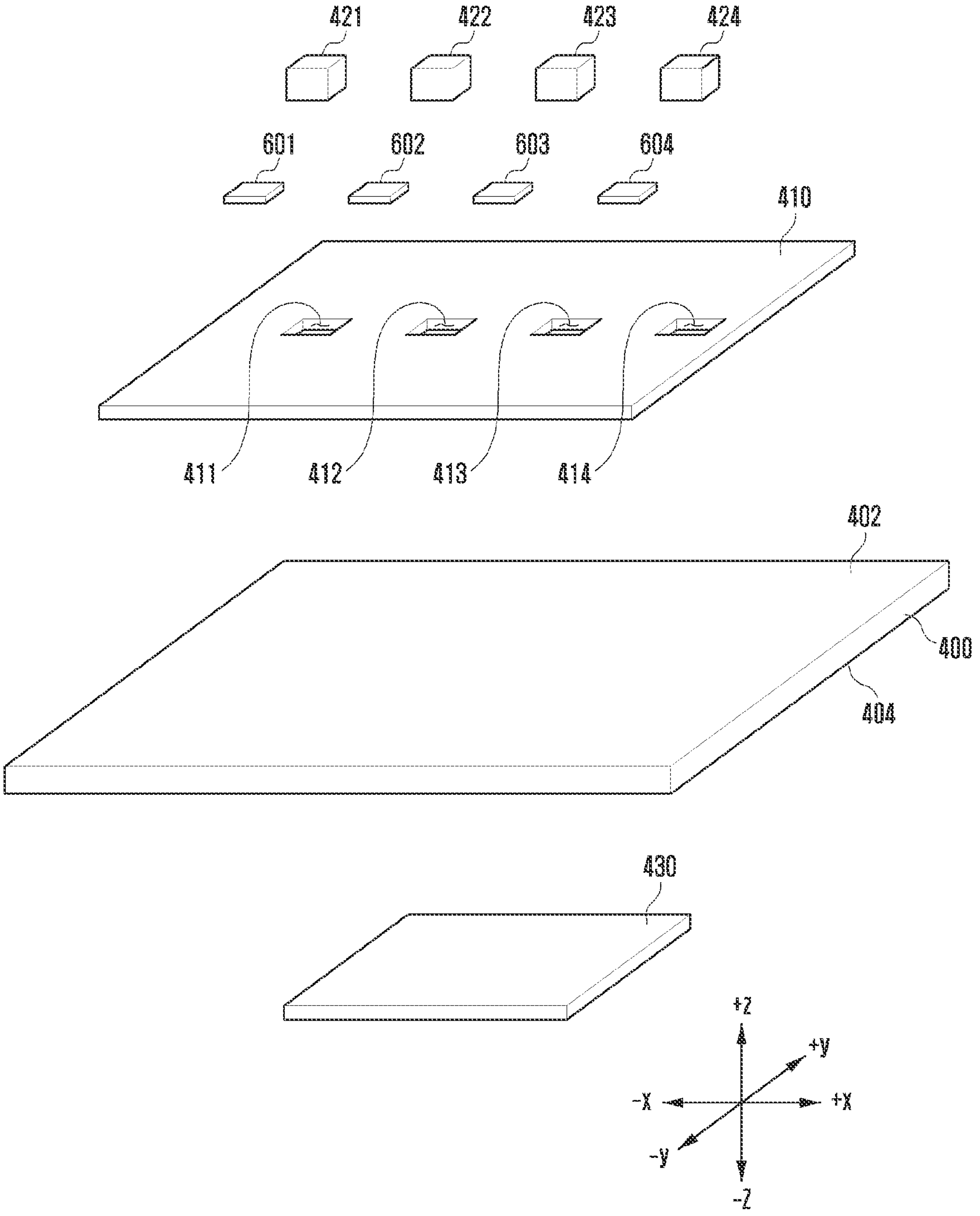
FIG. 6A and FIG. 6B are perspective views illustrating another example of a structure of an antenna module according to various embodiments.
Figure 6B:
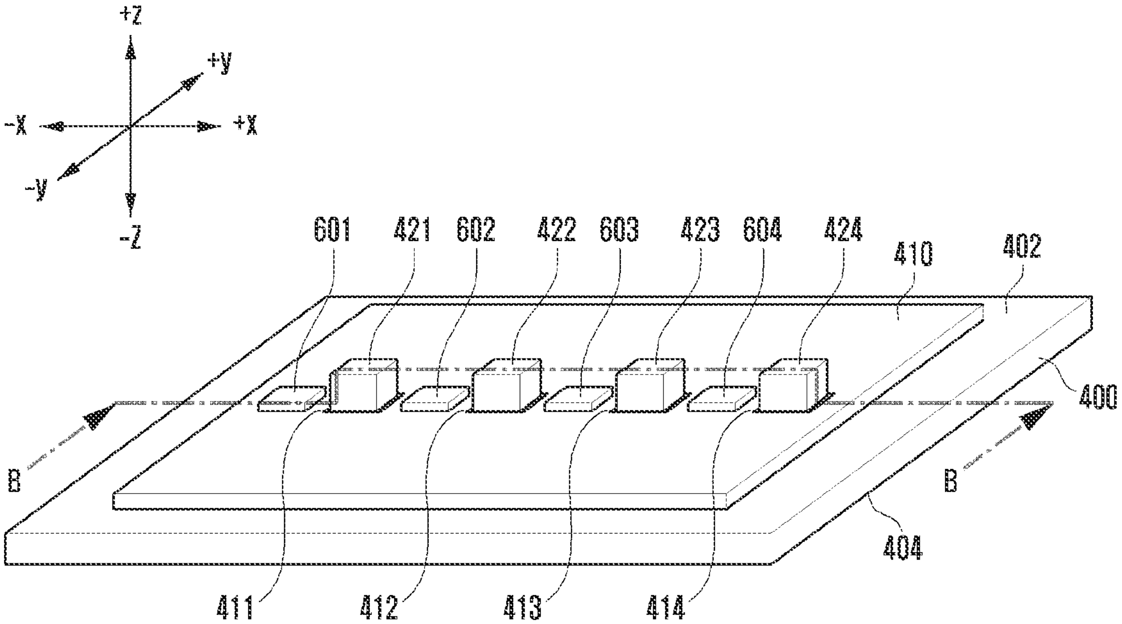

FIG. 6A and FIG. 6B are perspective views illustrating another example of a structure of an antenna module according to various embodiments. According to an embodiment, an antenna module of FIG. 6A and FIG. 6B may be at least partially similar to the third antenna module 246 of FIG. 2, and may include various embodiments of an antenna module.

According to various embodiments referring to FIG. 6A and FIG. 6B, an antenna module may include a first substrate 410, multiple antenna structures 421, 422, 423, and 424, a wireless communication circuit 430, and multiple other antenna structures 601, 602, 603, and 604. For example, the wireless communication circuit 430 of FIG. 6A and FIG. 6B may operate similar to the wireless communication circuit 430 of FIG. 4A and FIG. 4B. Therefore, in connection with descriptions of FIG. 6A and FIG. 6B, in order to avoid overlapping descriptions with FIG. 4A and FIG. 4B, detailed descriptions for the wireless communication circuit 430 may not be repeated.

Figure 6C:
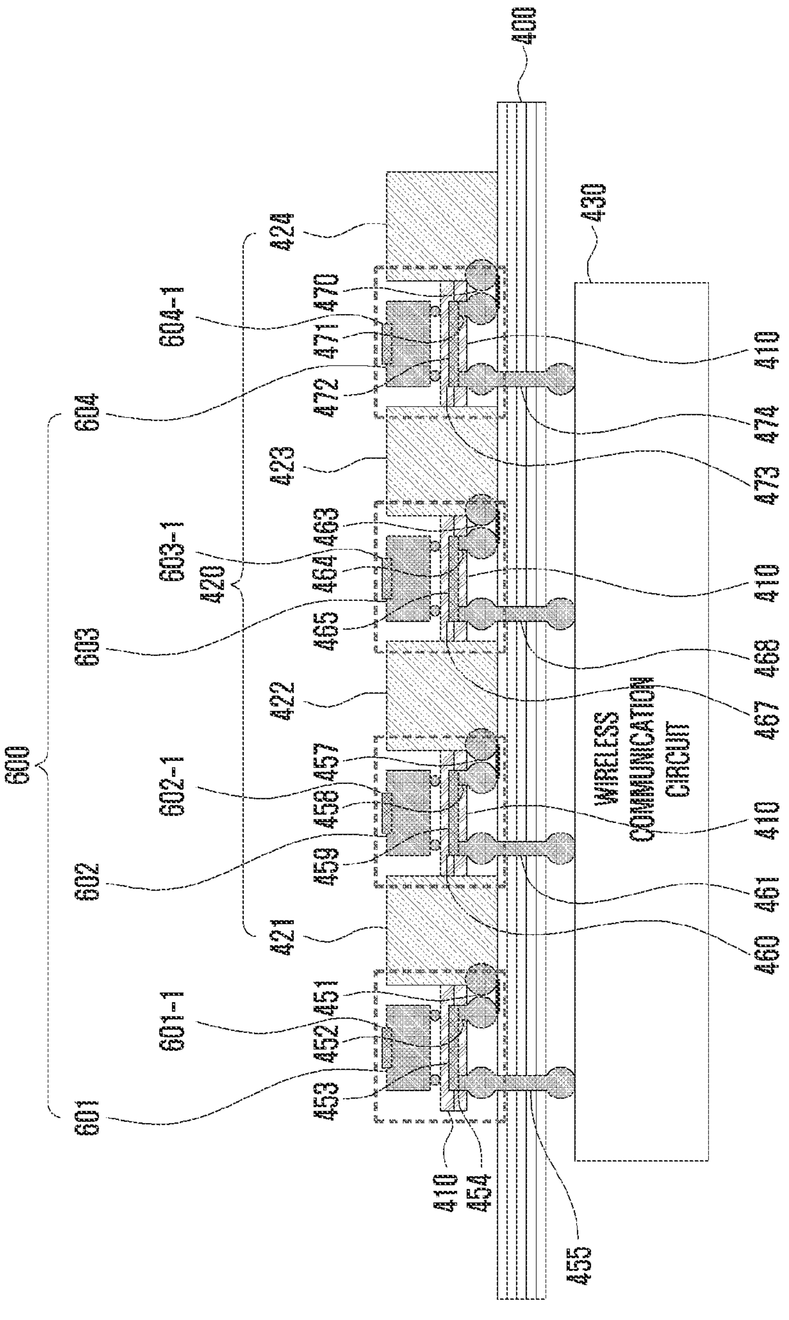
FIG. 6C is a cross sectional view of an antenna module seen from line B-B of FIG. 6B according to various embodiments.

According to various embodiments, the multiple antenna structures 421, 422, 423, and 424 may include multiple antenna elements (e.g., the multiple antenna elements 421-1, 422-1, 423-1, and 424-1 of FIG. 6C) arranged at designated intervals to form a directional beam. According to an embodiment, each of the antenna structures 421, 422, 423, or 424 may include at least one antenna element disposed at a designated interval. According to an embodiment, the multiple antenna elements included in the multiple antenna structures 421, 422, 423, and 424, as an array antenna 420 for supporting a first frequency band (e.g., a low-frequency band), may be set to form a beam pattern in a first direction (e.g., the z axis direction) in order for a signal of the first frequency band.

According to various embodiments, each of the multiple antenna structures 421, 422, 423, and 424 may be arranged in a method that they extend through (or are inserted into) the through-holes 411, 412, 413, and 414 of the first substrate 410, respectively. According to an embodiment, in the case where the multiple antenna structures 421, 422, 423, and 424 are arranged inside the through-holes 411, 412, 413, and 414 of the first substrate 410, at least parts thereof may be exposed outside the through-holes 411, 412, 413, and 414 of the first substrate 410, respectively. For example, the first substrate 410 may be at least partially coupled or connected to the multiple antenna structures 421, 422, 423, and 424 through a conductive bonding method.

According to various embodiments, the first substrate 410 may include an electrical connection structure for electrically connecting the multiple antenna structures 421, 422, 423, and 424 arranged in the through-holes 411, 412, 413, and 414 and the main substrate 400. According to an embodiment, the first substrate 410 may provide an electrical connection between the first substrate 410 and/or various electronic components (e.g., the multiple antenna structures 421, 422, 423, and 424 and/or the main substrate 400) arranged outside thereof using an electrical connection structure (e.g., wires and conductive vias formed on and through a conductive layer). According to an embodiment, an electrical connection structure included in the first substrate 410 may include a matching element (e.g., 453, 459, 465, or 472 of FIG. 4C) for at least one antenna element (e.g., the 421-1, 422-1, 423-1, and/or 424-1 of FIG. 4C) included in each of the multiple antenna structures 421, 422, 423, and 424.

According to various embodiments, the multiple other antenna structures 601, 602, 603, and 604 may include multiple other antenna elements (e.g., the 601-1, 602-1, 603-1, and 604-1 of FIG. 6C) arranged at designated intervals to form a directional beam. According to an embodiment, each of the other antenna structures 601, 602, 603, or 604 may include at least one antenna element disposed at a designated interval. According to an embodiment, the multiple other antenna elements included in the multiple other antenna structures 601, 602, 603, and 604, as an array antenna 600 for supporting a second frequency band (e.g., a high-frequency band), may be set to form a beam pattern in a first direction (e.g., the z axis direction) in order for a signal of the second frequency band.

According to various embodiments, the multiple other antenna structures 601, 602, 603, and 604 may be arranged on the first substrate 410. For example, the first substrate 410 may be electrically and/or physically connected to the multiple other antenna structures 601, 602, 603, and 604 through a conductive bonding method.

According to various embodiments, the first substrate 410 may include an electrical connection structure for electrically connecting the multiple other antenna structures 601, 602, 603, and 604 and the main substrate 400. According to an embodiment, the first substrate 410 may provide an electrical connection between the first substrate 410 and/or various electronic components (e.g., the multiple other antenna structures 601, 602, 603, and 604 and/or the main substrate 400) arranged outside thereof using an electrical connection structure (e.g., wires and conductive vias formed on and through a conductive layer). According to an embodiment, an electrical connection structure included in the first substrate 410 may include a matching element (e.g., 621, 622, 623, 624, 625, 626, 627, or 628 of FIG. 6E) for at least one antenna element (e.g., the 601-1, 602-1, 603-1, and/or 604-1 of FIG. 6C) included in each of the multiple other antenna structures 601, 602, 603, and 604.

According to various embodiments, the wireless communication circuit 430 may be disposed on a second surface 404 of the main substrate 400 (e.g., the printed circuit board 324 of FIG. 3C). According to an embodiment, the wireless communication circuit 430 may transmit and/or receive a wireless signal in a designated frequency band through the multiple antenna elements (e.g., the 421-1, 422-1, 423-1, and 424-1 of FIG. 6C) arranged on the multiple antenna structures 421, 422, 423, and 424, or the multiple other antenna elements (e.g., 601-1, 602-1, 603-1, and 604-1 of FIG. 6C) arranged on the multiple other antenna structures 601, 602, 603, and 604. According to an embodiment, the wireless communication circuit 430 may transmit and/or receive a wireless signal in a first frequency band (e.g., a low-frequency band) through the multiple antenna elements (e.g., the 421-1, 422-1, 423-1, and 424-1 of FIG. 4C) arranged in the multiple antenna structures 421, 422, 423, and 424 which are electrically connected through the first substrate 410 and the main substrate 400. According to an embodiment, the wireless communication circuit 430 may transmit and/or receive a wireless signal in a second frequency band (e.g., a high-frequency band) through the multiple other antenna elements (e.g., 601-1, 602-1, 603-1, and 604-1 of FIG. 6C) arranged in the multiple other antenna structures 601, 602, 603, and 604 which are electrically connected through the first substrate 410 and the main substrate 400.

Figure 6D:
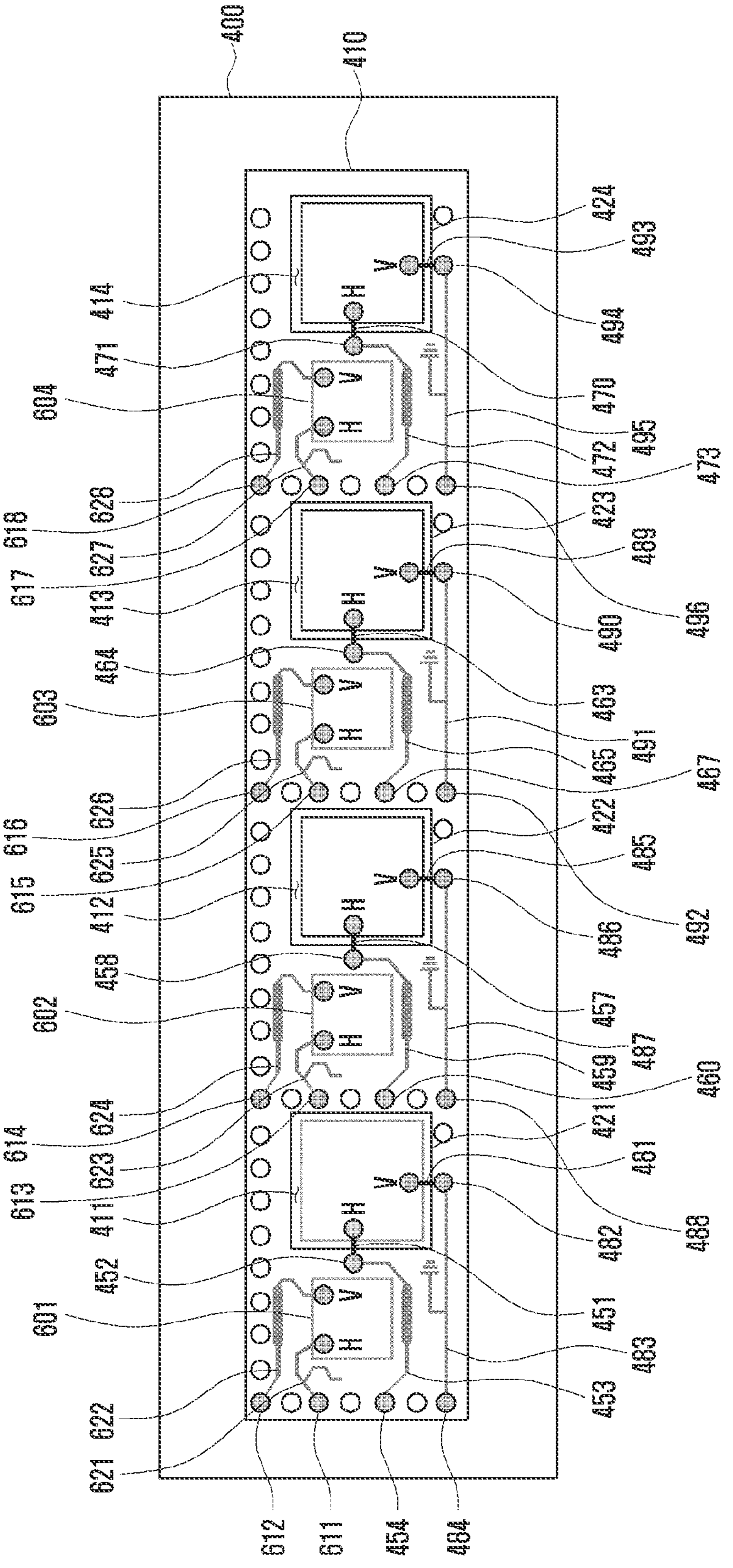
FIG. 6D is a plan view of an antenna module seen toward the −z axis direction of FIG. 6B according to various embodiments.

FIG. 6C is a cross sectional view of an antenna module seen from line B-B of FIG. 6B according to various embodiments. FIG. 6D is a plan view of an antenna module seen toward the −z axis direction of FIG. 6B according to various embodiments.

According to various embodiments referring to FIG. 6C and FIG. 6D, the multiple antenna structures 421, 422, 423, and 424 may be arranged in the through-holes 411, 412, 413, and 414 formed through at least a part of the first substrate 410, and may be coupled or connected to the first substrate 410 and/or the main substrate 400. According to an embodiment, when the first surface 402 of the main substrate 400 is seen from above (when seen toward the −z axis direction), as illustrated in FIG. 6D, the multiple antenna structures 421, 422, 423, and 424 may be arranged in the through-holes 411, 412, 413, and 414 of the first substrate 410.

According to various embodiments, the first substrate 410 may include an electrical connection structure configured to electrically connect the multiple antenna elements 421-1, 422-1, 423-1, and 424-1 included in the multiple antenna structures 421, 422, 423, and 424 and the main substrate 400 (or the wireless communication circuit 430). According to an embodiment, in order to avoid overlapping descriptions with FIGS. 4C and 4D, detailed descriptions for an electrical connection structure configured to electrically connect the multiple antenna elements 421-1, 422-1, 423-1, and 424-1 and the main substrate 400 (or the wireless communication circuit 430) will be omitted.

According to various embodiments, the first substrate 410 may include an electrical connection structure configured to electrically connect the multiple other antenna elements 601-1, 602-1, 603-1, and 604-1 included in the multiple other antenna structures 601, 602, 603, and 604 and the main substrate 400 (or the wireless communication circuit 430). According to an embodiment, an electrical connection structure included in the first substrate 410 may include a matching element 621, 622, 623, 624, 625, 626, 627, or 628 for the other antenna elements 601-1, 602-1, 603-1, or 604-1 included in each of the multiple other antenna structures 601, 602, 603, and 604. For example, the matching element 621, 622, 623, 624, 625, 626, 627, or 628 may perform a function for matching an impedance of the other antenna elements 601-1, 602-1, 603-1, or 604-1 electrically connected. According to an embodiment, the first substrate 410 may include an electrical connection structure for a first polarization (e.g., H) and a second polarization (e.g., V) of the multiple other antenna elements 601-1, 602-1, 603-1, and 604-1 included in the multiple other antenna structures 601, 602, 603, and 604. For example, a first other antenna element 601-1 disposed on a first other antenna structure 601 may be electrically connected to a seventeenth matching element 621 in order for a signal of the first polarization. The seventeenth matching element 621 may be electrically connected to the first substrate 410 through a forty-first via 611. The first other antenna element 601-1 may be electrically connected to an eighteenth matching element 622 in order for a signal of the second polarization. The eighteenth matching element 622 may be electrically connected to the first substrate 410 through a forty-second via 612.

For example, a second other antenna element 602-1 disposed on a second other antenna structure 602 may be electrically connected to a nineteenth matching element 623 in order for a signal of the first polarization. The nineteenth matching element 623 may be electrically connected to the first substrate 410 through a forty-third via 613. The second other antenna element 602-1 may be electrically connected to a twentieth matching element 624 in order for a signal of the second polarization. The twentieth matching element 624 may be electrically connected to the first substrate 410 through a forty-fourth via 614.

For example, a third other antenna element 603-1 disposed on a third other antenna structure 603 may be electrically connected to a twenty-first matching element 625 in order for a signal of the first polarization. The twenty-first matching element 625 may be electrically connected to the first substrate 410 through a forty-fifth via 615. The third other antenna element 603-1 may be electrically connected to a twenty-second matching element 626 in order for a signal of the second polarization. The twenty-second matching element 626 may be electrically connected to the first substrate 410 through a forty-sixth via 616.

For example, a fourth other antenna element 604-1 disposed on a fourth other antenna structure 604 may be electrically connected to a twenty-third matching element 627 in order for a signal of the first polarization. The twenty-third matching element 627 may be electrically connected to the first substrate 410 through a forty-seventh via 617. The fourth other antenna element 604-1 may be electrically connected to a twenty-fourth matching element 628 in order for a signal of the second polarization. The twenty-fourth matching element 628 may be electrically connected to the first substrate 410 through a forty-eighth via 618.

Figure 6E:
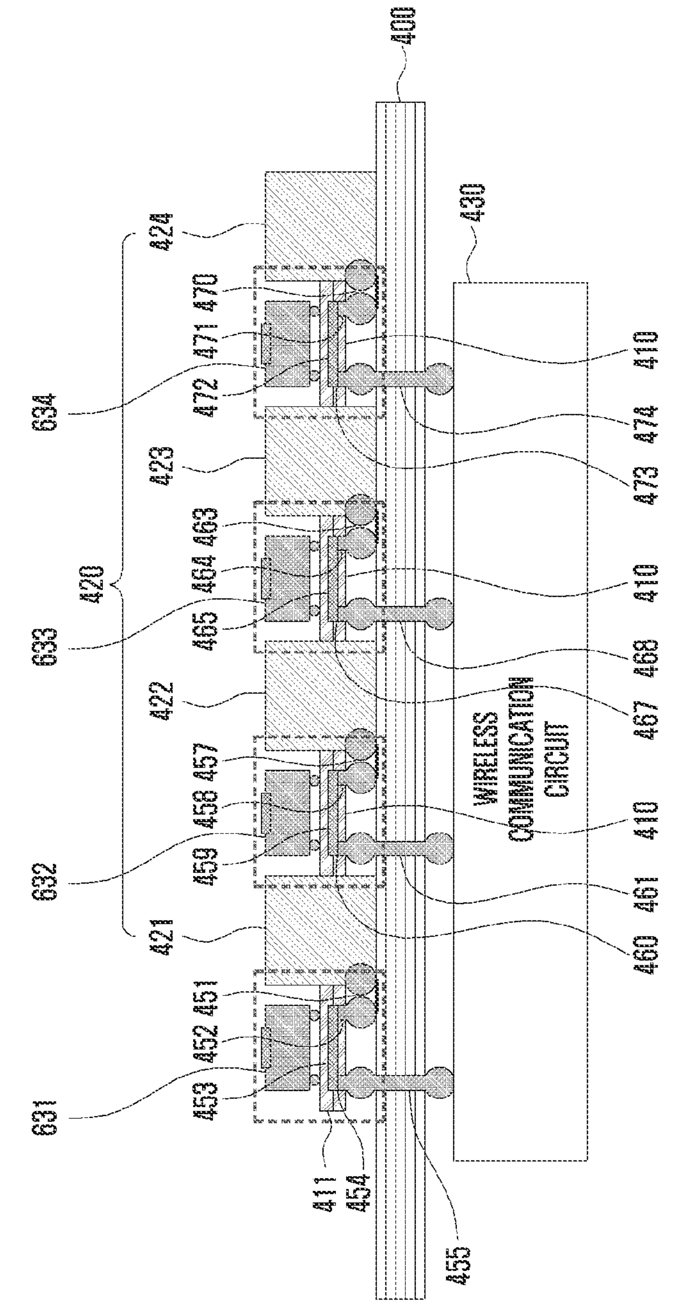
FIG. 6E is a cross sectional view illustrating another example of a structure of an antenna module according to various embodiments.

FIG. 6E is a cross sectional view illustrating another example of a structure of an antenna module according to various embodiments.

According to various embodiments referring to FIG. 6E, an antenna module may include a first substrate 410, multiple antenna structures 421, 422, 423, and 424, a wireless communication circuit 430, and multiple other antenna elements 631, 632, 633, and 634 arranged on the first substrate 410. For example, the multiple antenna structures 421, 422, 423, and 424 and the wireless communication circuit 430 of FIG. 6E may be operate similar to the multiple antenna structures 421, 422, 423, and 424 and the wireless communication circuit 430 of FIG. 4A and FIG. 4B. Therefore, in connection with descriptions of FIG. 6E, in order to avoid overlapping descriptions with FIG. 4A and FIG. 4B, detailed descriptions for the multiple antenna structures 421, 422, 423, and 424 and the wireless communication circuit 430 will be omitted.

According to various embodiments, the first substrate 410 may have multiple other antenna elements 631, 632, 633, and 634 arranged to form a directional beam. According to an embodiment, the multiple other antenna elements 631, 632, 633, and 634 may be formed on a surface of the first substrate 410 or inside thereof. According to an embodiment, the multiple other antenna elements 631, 632, 633, and 634 may support a frequency band different from that of the multiple antenna elements 421-1, 422-1, 423-1, and 424-1 arranged in the multiple antenna structures 421, 422, 423, and 424.

According to various embodiments, the first substrate 410 may include an electrical connection structure for electrically connecting the multiple other antenna elements 631, 632, 633, and 634 and the main substrate 400. According to an embodiment, the first substrate 410 may provide an electrical connection between the first substrate 410 and/or various electronic components (e.g., the multiple other antenna elements 631, 632, 633, and 634 and/or the main substrate 400) arranged outside thereof using an electrical connection structure (e.g., wires and conductive vias formed on and through a conductive layer). According to an embodiment, an electrical connection structure included in the first substrate 410 may include a matching element for the multiple other antenna elements 631, 632, 633, and 634.

According to an embodiment, the wireless communication circuit 430 may transmit and/or receive a wireless signal in a designated frequency band through the multiple antenna elements 421-1, 422-1, 423-1, and 424-1 arranged on the multiple antenna structures 421, 422, 423, and 424, or the multiple other antenna elements 631, 632, 633, and 634 arranged on the first substrate 410. According to an embodiment, the wireless communication circuit 430 may transmit and/or receive a wireless signal in a first frequency band (e.g., a low-frequency band) through the multiple antenna elements (e.g., the 421-1, 422-1, 423-1, and 424-1 of FIG. 4C) arranged on the multiple antenna structures 421, 422, 423, and 424 which are electrically connected through the first substrate 410 and the main substrate 400. According to an embodiment, the wireless communication circuit 430 may transmit and/or receive a wireless signal in a second frequency band (e.g., a high-frequency band) through the multiple other antenna elements 631, 632, 633, and 634 which are electrically connected through the first substrate 410 and the main substrate 400.

Figure 7:
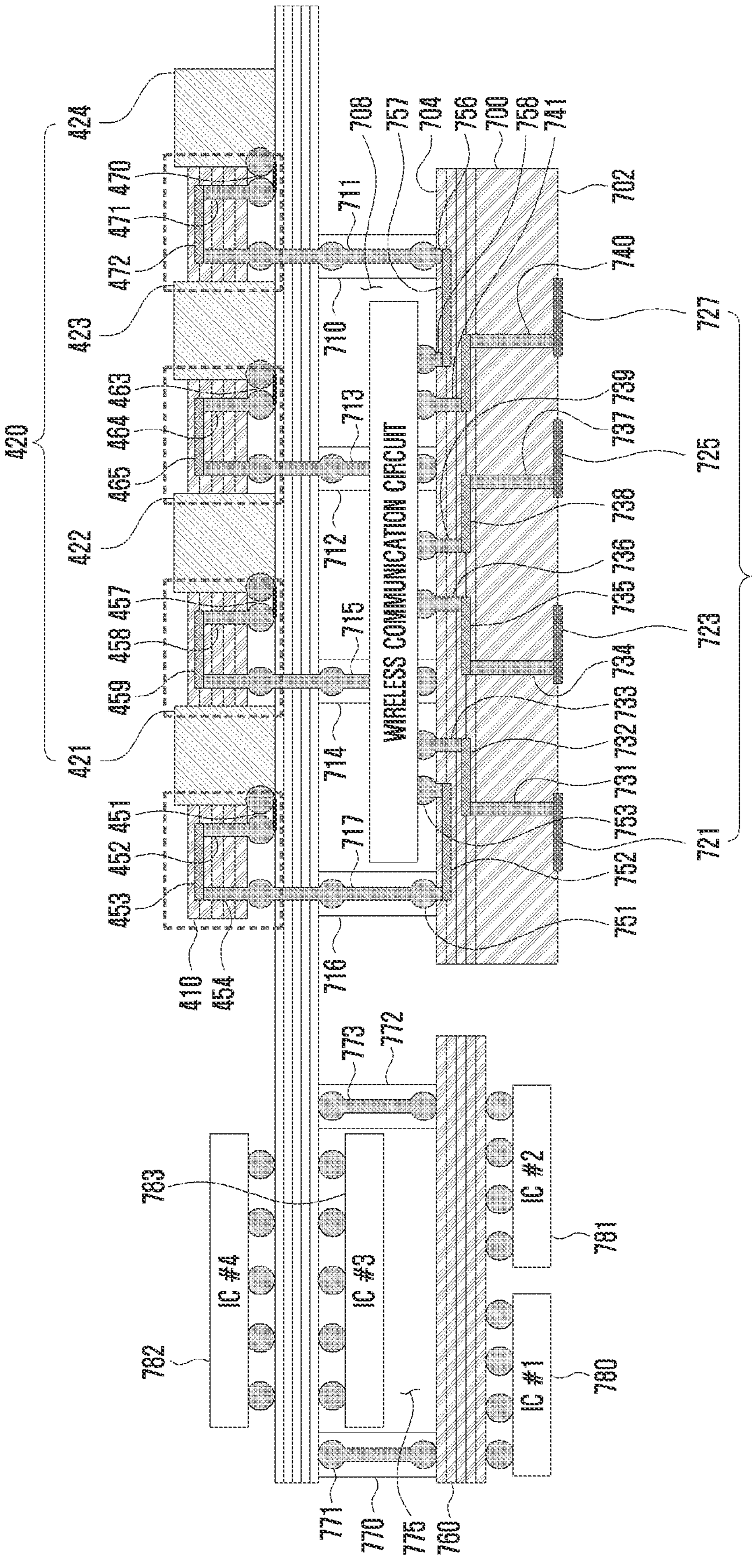
FIG. 7 is a cross sectional view illustrating an example of a structure of an antenna module including multiple array antennas according to various embodiments.

FIG. 7 is a cross sectional view illustrating an example of a structure of an antenna module including multiple array antennas according to various embodiments. According to an embodiment, an antenna module of FIG. 7 may be at least partially similar to the third antenna module 246 of FIG. 2, and may include various embodiments of an antenna module.

According to various embodiments referring to FIG. 7, an antenna module may include a first substrate 410, multiple antenna structures 421, 422, 423, and 424, a wireless communication circuit 430, and a third substrate 700 including multiple other antenna elements 720. According to an embodiment, in order to avoid overlapping descriptions with FIG. 4A, FIG. 4B, and/or FIG. 4C, detailed descriptions for the first substrate 410, the multiple antenna structures 421, 422, 423, and 424, and the wireless communication circuit 430 of FIG. 7 may not be repeated.

According to various embodiments, the multiple antenna structures 421, 422, 423, and 424 may be arranged in a method that they extend through (or are inserted into) the through-holes 401, 402, 403, and 404 formed through at least a part of the first substrate 410. For example, the multiple antenna structures 421, 422, 423, and 424 may include multiple antenna elements 421-1, 422-1, 423-1, and 424-1 arranged to form a beam in a first direction (e.g., the z axis direction).

According to various embodiments, the third substrate 700 may include the multiple other antenna elements 720 arranged to form a beam in a second direction (e.g., the −z axis direction).

According to various embodiments, the multiple other antenna elements 720 arranged on the third substrate 700 may be electrically connected to the wireless communication circuit 430 disposed on the third substrate 700. According an embodiment, the wireless communication circuit 430 may be disposed on the third substrate 700 in an inner space 708 formed by the main substrate 400, interposers 710, 712, 714, and/or 716, and the third substrate 700.

According to an embodiment, a first other antenna element 721 may be electrically connected to a twenty-fifth matching circuit 732 of the third substrate 700 through a forty-ninth via 731 of the third substrate 700. The twenty-fifth matching circuit 732 may be electrically connected to the wireless communication circuit 430 through a fiftieth via 733 of the third substrate 700. As an example, the twenty-fifth matching circuit 732 may include at least one conductive pattern disposed on at least a part of multiple insulation layers of the third substrate 700.

According to an embodiment, a second other antenna element 723 may be electrically connected to a twenty-sixth matching circuit 735 of the third substrate 700 through a fifty-first via 734 of the third substrate 700. The twenty-sixth matching circuit 735 may be electrically connected to the wireless communication circuit 430 through a fifty-second via 736 of the third substrate 700. As an example, the twenty-sixth matching circuit 735 may include at least one conductive pattern disposed on at least a part of multiple insulation layers of the third substrate 700.

According to an embodiment, a third other antenna element 725 may be electrically connected to a twenty-seventh matching circuit 738 of the third substrate 700 through a fifty-third via 737 of the third substrate 700. The twenty-seventh matching circuit 738 may be electrically connected to the wireless communication circuit 430 through a fifty-fourth via 739 of the third substrate 700. As an example, the twenty-seventh matching circuit 738 may include at least one conductive pattern disposed on at least a part of multiple insulation layers of the third substrate 700.

According to an embodiment, a fourth other antenna element 727 may be electrically connected to a twenty-eighth matching circuit 741 of the third substrate 700 through a fifty-fifth via 740 of the third substrate 700. The twenty-eighth matching circuit 741 may be electrically connected to the wireless communication circuit 430 through a fifty-sixth via 742 of the third substrate 700. As an example, the twenty-eighth matching circuit 741 may include at least one conductive pattern disposed on at least a part of multiple insulation layers of the third substrate 700.

According to various embodiments, the wireless communication circuit 430 may be electrically connected to the first substrate 410 through the third substrate 700 and the main substrate 400. According to an embodiment, the wireless communication circuit 430 may be electrically connected to a third via 455 of the main substrate 400 through a fifty-seventh via 753 of the third substrate 700, a seventeenth electrical wire 752, a fifty-eighth via 751, and fifty-ninth via 717 of a fourth interposer 716. For example, the third via 455 of the main substrate 400 may be electrically connected to a first matching element 453 through a second via 454 of the first substrate. As an example, the first matching element 453 may be electrically connected to a first antenna element 421-1 disposed on a first antenna structure 421.

According to an embodiment, the wireless communication circuit 430 may be electrically connected to a seventh via 461 of the main substrate 400 through a sixtieth via 715 of a third interposer 714. For example, the seventh via 461 of the main substrate 400 may be electrically connected to a second matching element 459 through a sixth via 460 of the first substrate. As an example, the second matching element 459 may be electrically connected to a second antenna element 422-1 disposed on a second antenna structure 422.

According to an embodiment, the wireless communication circuit 430 may be electrically connected to an eleventh via 468 of the main substrate 400 through a sixty-first via 713 of a second interposer 712. For example, the eleventh via 468 of the main substrate 400 may be electrically connected to a third matching element 465 through a tenth via 467 of the first substrate. As an example, the third matching element 465 may be electrically connected to a third antenna element 423-1 disposed on a third antenna structure 423.

According to an embodiment, the wireless communication circuit 430 may be electrically connected to a fifteenth via 474 of the main substrate 400 through a sixty-second via 758 of the third substrate 700, an eighteenth electrical wire 757, a sixty-third via 756, and a sixty-fourth via 711 of a first interposer 710. For example, the fifteenth via 474 of the main substrate 400 may be electrically connected to a fourth matching element 472 through a fourteenth via 473 of the first substrate. As an example, the fourth matching element 472 may be electrically connected to a fourth antenna element 424-1 disposed on a fourth antenna structure 424.

According to various embodiments, the main substrate 400 may be electrically and/or physically connected to other main substrate 760 through the interposers 770 and 772. According to an embodiment, the main substrate 400 may be electrically connected to the other main substrate 760 through a sixty-fifth via 751 of a fifth interposer 770 and a sixty-sixth via 773 of the sixth interposer 772.

According to various embodiments, the main substrate 400 and/or the other main substrate 760 each may have at least one circuit 780, 781, 782, and/or 783 disposed thereon. According an embodiment, a first circuit 780 and a second circuit 781 may be arranged on one surface of the other main substrate 760. For example, the other main substrate 760 may include a shielding member disposed on a part of the other main substrate 760 such that the first circuit 780 and the second circuit 781 arranged on the one surface of the other main substrate 760 is electromagnetically shielded. As an example, the shielding member may include a shield can. As an example, the at least one circuit 780, 781, 782, and/or 783 may include a communication processor (CP) and/or a PMIC.

According to an embodiment, a third circuit 782 may be disposed on one surface (e.g., the first surface 402) of the main substrate 400. For example, the main substrate 400 may include a shielding member disposed on a part of the main substrate 400 such that the third circuit 782 disposed on the one surface of the main substrate 400 is electromagnetically shielded.

According to an embodiment, the main substrate 400 and the other main substrate 760 may include at least circuit disposed in an inner space 775 secured by the interposers 770 and 772. For example, a fourth circuit 783 may be disposed on a second surface 404 of the main substrate 400 in the in inner space 775 secured by the interposers 770 and 772.

According to an embodiment, the first circuit 780, the second circuit 781, the third circuit 782, and/or the fourth circuit 783 may be electrically connected to the wireless communication circuit 430 using an electrical connection structure (e.g., wires and conductive vias formed on or through a conductive layer) arranged on the main substrate 400, the other main substrate 760, and/or the third substrate 700.

According to an embodiment, the wireless communication circuit 430 may be disposed on one surface (e.g., the second surface 404) of the main substrate 400.

According to various embodiments, a matching structure may include an open (single open or multiple open) structure, a short stub structure, and/or λ/4 transformer (single step quarter-wave transformer or multi step quarter-wave transformer) structure.

According to various example embodiments, an electronic device (e.g., the electronic device 101 of FIG. 1 or FIG. 2, or the electronic device 300 of FIG. 3A to FIG. 3C) may include: a housing (e.g., the housing 310 FIG. 3A), a main substrate (e.g., the main substrate 400 FIG. 4A or FIG.

6A) disposed in an inner space of the housing and including a first surface (e.g., the first surface 402 of FIG. 4A or FIG. 6A) facing a first direction and a second surface (e.g., the second surface 404 of FIG. 4A or FIG. 6A) facing a second direction opposite to the first direction, and an antenna module disposed on the main substrate, wherein the antenna module includes a first substrate (e.g., the first substrate 410 of FIG. 4A or FIG. 6A) disposed on the first surface of the main substrate and including multiple through-holes (e.g., the through-holes 401, 402, 403, and 404 of FIG. 4A or FIG. 6A), multiple antenna structures (e.g., the multiple antenna structures 421, 422, 423, and 424 of FIG. 4A or FIG. 6A) disposed to penetrate the multiple through-holes, respectively, and including at least one antenna element comprising an antenna (e.g., the 421-1, 4221, 423-1, and 424-1 of FIG. 4A or FIG. 6A) spaced at a designated interval, and a matching structure (e.g., the matching structure 453, 459, 465, 472, 483, 487, 491, and/or 495 of FIG. 4A or FIG. 6A) comprising impedance matching circuitry disposed on the first substrate and configured to match impedance for the at least one antenna element included in each of the multiple antenna structures.

According to various example embodiments, the multiple antenna structures may protrude beyond the first substrate.

According to various example embodiments, each of the multiple antenna structures may include a rigid body and the at least one antenna element included in the rigid body.

According to various example embodiments, the rigid body and the first substrate may have different permittivities.

According to various example embodiments, the first substrate may be coupled or connected to the main substrate, and the multiple antenna structures may be coupled or connected to the first substrate and/or the main substrate.

According to various example embodiments, the antenna module may further include a wireless communication circuit (e.g., the wireless communication circuit 430 of FIG. 4A or FIG. 6A) disposed on the second surface of the main substrate and electrically connected to the first substrate through the main substrate, and the wireless communication circuit may be configured to transmit and/or receive a wireless signal in a designated frequency band through at least one antenna element included in each of the multiple antenna structures.

According to various example embodiments, the matching structure may include at least one conductive pattern disposed on at least one insulation layer in the first substrate.

According to various example embodiments, the matching structure may include a passive element disposed on the first substrate.

According to various example embodiments, the antenna module may further include an electrical connection structure comprising a conductive material disposed on the first substrate and configured to electrically connect each of the multiple antenna structures to the main substrate.

According to various example embodiments, the antenna module may further include multiple other antenna structures (e.g., the multiple other antenna structures 601, 602, 603, and 604 of FIG. 6A) including at least one other antenna element comprising an antenna (e.g., the other antenna elements 601-1, 602-1, 603-1, and/or 604-1 of FIG. 6C) disposed on the first substrate and spaced at a designated interval, and the at least one other antenna element included in each of the multiple other antenna structures may be configured to support a frequency band different from that of the at least one antenna element included in each of the multiple antenna structures.

According to various example embodiments, the antenna module may further include an electrical connection structure comprising a conductive material disposed on the first substrate and configured to electrically connect each of the multiple antenna structures to the main substrate, and when the first surface of the main substrate is viewed from above, the multiple other antenna structures may be arranged to at least partially overlap the electrical connection structure.

According to various example embodiments, the multiple other antenna structures and the first substrate may be at least partially coupled or connected to each other through conductive bonding.

According to various example embodiments, the antenna module may further include multiple other antenna elements comprising an antenna (e.g., the multiple other antenna elements 631, 632, 633, and 634 of FIG. 6E) spaced and arranged at designated interval on the first substrate, and the multiple other antenna elements may be configured to support a frequency band different from that of the at least one antenna element included in each of the multiple antenna structures.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:

a main substrate comprising a first surface facing a first direction and a second surface facing a second direction opposite to the first direction; and an antenna module disposed on the main substrate, wherein the antenna module comprises:

a first substrate disposed on the first surface of the main substrate, the first substrate including multiple through-holes, multiple antenna structures at least partially disposed in the multiple through-holes, respectively, and comprising at least one antenna element spaced at a designated interval, and a matching structure comprising impedance matching circuitry disposed on the first substrate and configured to match impedance for the at least one antenna element included in each of the multiple antenna structures.

2. The electronic device of claim 1, wherein the multiple antenna structures protrude beyond a surface of the first substrate.

3. The electronic device of claim 1, wherein each of the multiple antenna structures comprises a rigid body and the at least one antenna element included in the rigid body.

4. The electronic device of claim 3, wherein the rigid body and the first substrate have different permittivities.

5. The electronic device of claim 1, wherein the first substrate is coupled or connected to the main substrate, and the multiple antenna structures are coupled or connected to the first substrate and/or the main substrate.

6. The electronic device of claim 1, wherein the antenna module further comprises a wireless communication circuit disposed on the second surface of the main substrate and electrically connected to the first substrate through the main substrate, and the wireless communication circuit is configured to transmit and/or receive a wireless signal in a designated frequency band through at least one antenna element included in each of the multiple antenna structures.

7. The electronic device of claim 1, wherein the matching structure comprises at least one conductive pattern disposed on at least one insulation layer in the first substrate.

8. The electronic device of claim 1, wherein the matching structure comprises a passive element disposed on the first substrate.

9. The electronic device of claim 1, wherein the antenna module comprises an electrical connection structure comprising a conductive material disposed on the first substrate and configured to electrically connect each of the multiple antenna structures to the main substrate.

10. The electronic device of claim 1, wherein the antenna module further comprises multiple other antenna structures comprising at least one other antenna element disposed on the first substrate and spaced at a designated interval, and the at least one other antenna element included in each of the multiple other antenna structures is configured to support a frequency band different from a frequency band of the at least one antenna element included in each of the multiple antenna structures.

11. The electronic device of claim 10, wherein the antenna module comprises an electrical connection structure comprising a conductive material disposed on the first substrate and configured to electrically connect each of the multiple antenna structures to the main substrate, and when the first surface of the main substrate is viewed from above, the multiple other antenna structures are arranged to at least partially overlap the electrical connection structure.

12. The electronic device of claim 11, wherein the multiple other antenna structures and the first substrate are at least partially coupled or connected to each other through conductive bonding.

13. The electronic device of claim 1, wherein the antenna module further comprises multiple other antenna elements spaced and arranged at a designated interval on the first substrate, and the multiple other antenna elements configure to support a frequency band different from that of the at least one antenna element included in each of the multiple antenna structures.

14. An electronic device comprising:

a main substrate comprising a first surface facing a first direction and a second surface facing a second direction opposite to the first direction;

multiple antenna structures comprising at least one antenna element spaced and disposed at a designated interval on the first surface of the main substrate; and multiple sub substrates arranged adjacent to the multiple antenna structures on the first surface of the main substrate, wherein the multiple sub substrates comprise a matching structure comprising impedance matching circuitry configured to match impedance for the at least one antenna element included in each of the multiple antenna structures.

15. The electronic device of claim 14, wherein each of the multiple antenna structures comprises a rigid body and at least one antenna element included in the rigid body, and the rigid body and the multiple sub substrates have different permittivities.

16. The electronic device of claim 14, wherein the multiple sub substrates comprise an electrical connection structure comprising a conductive material configured to electrically connect the at least one antenna element and the main substrate.

17. The electronic device of claim 14, wherein the matching structure comprises at least one conductive pattern disposed on at least one insulation layer in each of the multiple sub substrates.

18. The electronic device of claim 14, wherein the matching structure comprises a passive element disposed on each of the multiple sub substrates.

19. The electronic device of claim 14, further comprising a wireless communication circuit disposed on the second surface of the main substrate, electrically connected to the multiple sub substrates through the main substrate, and configured to transmit and/or receive a wireless signal in a designated frequency band through at least one antenna element included in each of the multiple antenna structures.

20. The electronic device of claim 14, wherein the multiple sub substrates are coupled or connected to the main substrate, and the multiple antenna structures are coupled or connected to the multiple sub substrates and/or the main substrate.

* * * * *